United States Patent
Parshakova et al.

(10) Patent No.: US 12,086,708 B2
(45) Date of Patent: Sep. 10, 2024

(54) METHODS AND SYSTEMS FOR PRODUCING NEURAL SEQUENTIAL MODELS

(71) Applicant: NAVER CORPORATION, Seongnam-si (KR)

(72) Inventors: Tetiana Parshakova, Stanford, CA (US); Marc Dymetman, Grenoble (FR); Jean-Marc Andréoli, Meylan (FR)

(73) Assignee: NAVER CORPORATION, Seongnam-Si (KR)

( * ) Notice: Subject to any disclaimer, the term of this patent is extended or adjusted under 35 U.S.C. 154(b) by 1035 days.

(21) Appl. No.: 17/018,754

(22) Filed: Sep. 11, 2020

(65) Prior Publication Data
US 2022/0083852 A1 Mar. 17, 2022

(51) Int. Cl.
| | | |
|---|---|---|
| *G06F 40/10* | (2020.01) | |
| *G06F 18/214* | (2023.01) | |
| *G06F 18/2321* | (2023.01) | |
| *G06F 40/44* | (2020.01) | |
| *G06N 3/08* | (2023.01) | |

(52) U.S. Cl.
CPC ........... *G06N 3/08* (2013.01); *G06F 18/2148* (2023.01); *G06F 18/2321* (2023.01); *G06F 40/10* (2020.01); *G06F 40/44* (2020.01)

(58) Field of Classification Search
USPC ............... 704/9, 1, 2, 5, 7, 10, 257, 277
See application file for complete search history.

(56) References Cited

U.S. PATENT DOCUMENTS

| | | | |
|---|---|---|---|
| 11,282,506 B1 * | 3/2022 | Graves | G06N 3/08 |
| 2019/0354567 A1 * | 11/2019 | Dehghani | G06N 3/044 |
| 2020/0034436 A1 * | 1/2020 | Chen | G06N 3/084 |
| 2021/0357187 A1 * | 11/2021 | Clement | G06F 8/33 |

OTHER PUBLICATIONS

Andor, D., et al., "Globally Normalized Transition-Based Neural Networks," Proceedings of the 54th Annual Meeting of the Association for Computational Linguistics, Berlin, Germany, 2016, pp. 2442-2452.

Bahdanau, D., et al., "An Actor-Critic Algorithm for Sequence Prediction," published on ArXiv.org as 1607.07086, Jul. 26, 2016, 12 pages.

Belanger, D., et al., "Structured Prediction Energy Networks," Proceedings of the 33rd International Conference on Machine Learning, New York, NY, USA, 2016, 10 pages.

(Continued)

*Primary Examiner* — Qi Han
(74) *Attorney, Agent, or Firm* — Greer, Burns & Crain, Ltd

(57) ABSTRACT

In a method for generating a normalized sequential model using a processor, a sequential energy-based model computed by a parameterized neural network is provided. The sequential energy-based model defines an unnormalized probability distribution over a target sequence for a context source. The normalized sequential model is generated by projecting the sequential energy-based model onto a target autoregressive model that approximates a normalized distribution associated with the sequential energy-based model.

48 Claims, 23 Drawing Sheets

(56) References Cited

OTHER PUBLICATIONS

Bellemare, M., et al., A Distributional Perspective on Reinforcement Learning, published on ArXiv org as 1707.06887, Jul. 21, 2017, 19 pages.

Bengio, Y., et al., "Adaptive Importance Sampling to Accelerate Training of a Neural Probabilistic Language Model," IEEE Transactions on Neural Networks 19, No. 4, Apr. 2008, pp. 713-722.

Carrasco, R., "Accurate Computation of the Relative Entropy between Stochastic Regular Grammars," RAIRO—Theoretical Informatics and Applications 31, No. 5, 1997, pp. 437-444.

Cortes, C., et al., "On the Computation of the Relative Entropy of Probabilistic Automata," International Journal of Foundations of Computer Science 19, No. 01, Feb. 1, 2008, 24 pages.

Gehring, J., et al., "Convolutional Sequence to Sequence Learning," published on ArXiv org as 1705.03122, Jul. 25, 2017, 15 pages.

Hinton, G., et al., "Distilling the Knowledge in a Neural Network," published on ArXiv org as 1503.02531, Mar. 9, 2015, 9 pages.

Hoang, C., et al., "Moment Matching Training for Neural Machine Translation: A Preliminary Study," published on ArXiv org as 1812.09836, Dec. 28, 2018, 14 pages.

Hochreiter S., et al., "Long short-term memory," Neural computation 9.8, 1997, pp. 1735-1780.

Jaques, N., et al., "Tuning Recurrant Neural Networks with Reinforcement Learning," published on ArXiv org as 1611.02796, Jan. 12, 2017, 12 pages.

Jebara, T., Log-Linear Models, Logistic Regression and Conditional Random Fields, available on the Internet: www.cs.columbia.edu/~jebara/6772/notes/notes4.pdf, Feb. 1, 2013, 30 pages.

Jordan, M., "The exponential family: Basics," Chapter 8, 2009, available on the Internet: people.eecs.berkeley.edu/~jordan/courses/260-spring10/other-readings/chapter8.pdf, 17 pages.

Kim, T., et al., "Deep Directed Generative Models with Energy-Based Probability Estimation," published on ArXiv org as 606.03439, Jun. 10, 2016, 9 pages.

Kingma, D., et al., "Adam: A Method for Stochastic Optimization," published on ArXiv org as 1412.6980, Dec. 22, 2014, 9 pages.

Lecun, Y., et al., "A Tutorial on Energy-Based Learning," available on the Internet: yann.lecun.com/exdb/publis/pdf/lecun-06.pdf, and published in Predicting Structured Data, 2006, pp. 191-246.

Mackay, D., "Information Theory Inference and Learning Algorithms," Chapter 29: Monte-Carlo Methods & Chapter 29-3: Rejection sampling, Cambridge University Press, 2003, 35 pages.

Mnih, V., et al., "Human-Level Control through Deep Reinforcement Learning," Nature 518, No. 7540, Feb. 26, 2015, pp. 529-533.

Ng, A., et al., "Algorithms for inverse reinforcement learning," Proceedings of the Seventeenth International Conference on Machine Learning, ICML '00, San Francisco, CA, USA, 2000, pp. 663-670.

Norouzi, M., et al., "Reward Augmented Maximum Likelihood for Neural Structured Prediction," NeurIPS Proceedings, Advances in Neural Information Processing Systems 29, 2016, 9 pages.

Owen, A., "Adaptive Importance Sampling," Grid Science Winter School, available on the Internet: statweb.stanford.edu/~owen/pubtalks/AdaptiveISweb.pdf, 2017, 106 pages.

Parshakova, T., et al. "Global Autoregressive Models for Data-Efficient Sequence Learning," Proceedings of the 23rd Conference on Computational Natural Language Learning, Hong Kong, China, Nov. 3-4, 2019, pp. 900-909.

Parshakova, T., et al. Distributional Reinforcement Learning for Energy-Based Sequential Models, Optimization Foundations for Reinforcement Learning Workshop at NeurIPS, Vancouver, Canada, 2019, 17 pages.

Paszke, A., et al., "Automatic Differentiation in PyTorch," 31st Conference on Neural Information Processing Systems, Long Beach, CA, USA, 2017, 4 pages.

Ranzato, M., et al., "Sequence Level Training with Recurrent Neural Networks," ICLR, 2016, 16 pages.

Russell, S., "Learning agents for uncertain environments (extended abstract)," Proceedings of the Eleventh Annual Conference on Computational Learning Theory, COLT'98, New York, NY, USA, 1998, pp. 101-103.

Schulman, J., et al., "Trust Region Policy Optimization," published on ArXiv org as 1502.05477, Feb. 19, 2015, 16 pages.

Schulman, J., et al., "Proximal Policy Optimization Algorithms," published on ArXiv org as 1707.06347, Aug. 28, 2017, 12 pages.

Sutskever, I., et al., "Sequence to Sequence Learning with Neural Networks," NIPS'14: Proceedings of the 27th International Conference on Neural Information Processing Systems, vol. 2, Dec. 2014, 9 pages.

Sutton, R., et al., "Reinforcement Learning: An Introduction," Second edition, Adaptive Computation and Machine Learning, Cambridge, MA London, The MIT Press, 2018, 548 pages.

Vaswani, A., et al., "Attention Is All You Need," 31st Conference on Neural Information Processing Systems, 2017, Long Beach, CA, USA, 11 pages.

\* cited by examiner

FIG. 10

```
 1: function TRAIN(D, V, T, f, t, DsSize, tReg, mode)          ▷ DsSize - distilled dataset size; tReg ∈ {rs, snàs}
 2:     r ← TRAINRNN(D, V, optAdam)                             ▷ initialize and then train RNN
 3:     P_λ ← TRAINGAM(r, D, V, tReg, f t)                      ▷ train λ for a given proposal r
 4:     if mode = 'two_stage' then                              ▷ Training-2: distill in one step
 5:         D̃, Ṽ, _ ← DISTILLBATCH(P_λ, DsSize)
 6:     else if mode = 'cyclic' then                            ▷ Cyclic-training: distill in several steps
 7:         D̃ ← {}; Ṽ ← {}; flag_λ ← False
 8:         while |D̃| < DsSize do
 9:             D̃_B, Ṽ_B, acceptRate ← DISTILLBATCH(P_λ, bSize)  ▷ acceptRate - acceptance rate of rs during distillation
10:             D̃.insert(D̃_B); Ṽ.insert(Ṽ_B)
11:             if not flag_λ then
12:                 r ← SINGLEUPDATERNN(r, D̃_B, optAdam)         ▷ improve proposal r
13:                 P_λ ← TRAINGAM(r, D, V, tReg, f t)            ▷ train λ for a given proposal r
14:                 flag_λ ← EARLYSTOPPING_λ(acceptRate)          ▷ check if acceptance rate has stopped improving
15:             D̃.insert(D); Ṽ.insert(V)                         ▷ add true data to the distilled one
16:         π_θ ← TRAINRNN(D̃, Ṽ, optAdam)
17:     return π_θ
18: function TRAINGAM(P_λ, D, V, tReg, f t)
19:     α_0 ← 10                                                 ▷ initial learning rate
20:     target_mom ← GETMOMENTS(D, V, f t)                       ▷ empirical moments of the given dataset
21:     while not EARLYSTOPPING(ℓ_λ_mom) do                      ▷ check if ℓ_λ_mom has stopped improving
22:         model_mom ← [0] × |f t|
23:         α_t ← α_0 / (1+t/#epoch)
24:         for b ∈ range(#updatesPerEpoch) do
25:             mean_mom ← GETMOMENTSGAM(P_λ, D, V, tReg, f t)
26:             model_mom ← (model_mom + mean_mom)/(b − 1) · (b−1)/b     ▷ accumulate the model's moments
27:             ∇_λ ← target_mom − mean_mom                      ▷ use rs or snàs to compute E_{x∼p_λ(·)} φ(x)
28:             λ ← λ + α_t · ∇_λ                                ▷ moving average
29:         ℓ_λ_mom ← ||target_mom − model_mom||_1              ▷ use Eq. 7 to compute gradients
30:     return P_λ
```

| tReg | [D] | m: $\frac{CE(T,r)}{CE(T,\pi\theta)}$ | m± $\frac{CE(T,\pi\theta)}{H(p_{true})}$ | m: $\frac{\text{mfLrq}(\pi\theta)}{\text{mfLrq}(r)}$ | mam: $\frac{CE(T,r)}{CE(T,\pi\theta)}$ | mam: $\frac{CE(T,\pi\theta)}{H(p_{true})}$ | mam: $\frac{\text{mfLrq}(\pi\theta)}{\text{mfLrq}(r)}$ |
|---|---|---|---|---|---|---|---|
| rs | 500 | 1.24 ± 0.07 | 1.19 ± 0.07 | [32.0, 392.0] | 1.23 ± 0.03 | 1.16 ± 0.03 | [59.26, 433.33] |
| rs | 1000 | 1.24 ± 0.07 | 1.16 ± 0.07 | [23.87, 653.33] | 1.21 ± 0.03 | 1.14 ± 0.03 | [26.29, 233.33] |
| rs | 5000 | 1.18 ± 0.08 | 1.09 ± 0.05 | [3.59, 206.67] | 1.16 ± 0.05 | 1.08 ± 0.04 | [7.32, 130.0] |
| rs | 10000 | 1.06 ± 0.1 | 1.04 ± 0.02 | [0.89, 196.0] | 1.02 ± 0.03 | 1.04 ± 0.03 | [1.0, 4.97] |
| rs | 20000 | 0.99 ± 0.01 | 1.02 ± 0.01 | [0.81, 1.76] | 0.99 ± 0.0 | 1.02 ± 0.0 | [0.85, 1.04] |

FIG. 12

| | | |
|---|---|---|
| 1 | *true* | 10110001011111001000001001001 |
| 2 | $r$ | 0111110001011111000111000101 |
| 3 | $\pi_\theta$ | 111010100010111110000111111100 |
| 4 | $ft$ | $[m, -, d_0, d_1, d_2, d_3]$ |
| 5 | $\lambda$'s | $[-10.1, -, -, -0.15, -0.06, 0.0, -0.14]$ |
| 6 | mom *true* | $[0.0, -, -, 0.47, 0.99, 1.0, 0.91]$ |
| 7 | mom $r$ | $[0.95, -, -, 0.53, 0.99, 1.0, 0.91]$ |
| 8 | mom $\pi_\theta$ | $[0.0006, -, -, 0.43, 0.99, 0.99, 0.91]$ |
| 9 | CEs | *true*: 0.45, $r$: 0.56, $\pi_\theta$: 0.47 |
| 10 | motif freqs | *true*: 1.0, $r$: 0.045, $\pi_\theta$: 0.959 |

FIG. 13

| $\|D\|$ | $m; \frac{mtfrq_{r,s}}{mtfrq_{s,i,s,r}}$ | $m; \frac{CE(r,s)}{CE(s,i,s,r)}$ | $m; \frac{time(r,s)}{time(s,i,s,r)}$ | $mam; \frac{mtfrq_{r,s}}{mtfrq_{s,i,s,r}}$ | $mam; \frac{CE(r,s)}{CE(s,i,s,r)}$ | $mam; \frac{time(r,s)}{time(s,i,s,r)}$ |
|---|---|---|---|---|---|---|
| 500 | 0.998 | 0.967 | 2.92 | 0.997 | 1.003 | 4.7 |
| 1000 | 1.009 | 0.973 | 2.038 | 0.77 | 1.07 | 3.638 |
| 5000 | 0.995 | 0.967 | 0.756 | 1.12 | 0.99 | 1.365 |
| 10000 | 1.134 | 0.956 | 1.514 | 1.011 | 1.002 | 1.005 |
| 20000 | 1.497 | 0.961 | 0.938 | 0.965 | 1.005 | 0.975 |

FIG. 14

| $\|D\|$ | $\dfrac{CE_{rs}}{CE_{rs}}\text{(cycl)}$ | $\dfrac{time_{rs}}{time_{rs}}\text{(cycl)}$ | $\dfrac{CE_{snisr}}{CE_{snisr}}\text{(cycl)}$ | $\dfrac{time_{snisr}}{time_{snisr}}\text{(cycl)}$ |
|---|---|---|---|---|
| 500 | 1.02 | 1.21 | 1.02 | 1.51 |
| 1000 | 1.0 | 1.48 | 1.08 | 2.04 |
| 5000 | 1.04 | 0.57 | 1.0 | 0.57 |
| 10000 | 0.98 | 1.47 | 1.02 | 0.45 |
| 20000 | 0.99 | 2.65 | 1.0 | 0.28 |

FIG. 15

Input: $P$, initial policy $q$
1: $\pi_\theta \leftarrow q$
2: for each iteration do
3:   for each episode do
4:     sample $x$ from $q(\cdot)$
5:     $\theta \leftarrow \theta + \alpha^{(\theta)} \frac{P(x)}{q(x)} \nabla_\theta \log \pi_\theta(x)$
6:   if $\pi_\theta$ is superior to $q$ then
7:     $q \leftarrow \pi_\theta$
Output: $\pi_\theta$

FIG. 16

| height[D] | $\frac{CE(T,\pi_\theta^{dpg})}{CE(T,\pi_\theta^{dks})}$ | $\frac{mf\_frq(\pi_\theta^{dpg})}{mf\_frq(\pi_\theta^{dks})}$ | $\frac{CE(T,\pi_\theta^{dpg})}{CE(T,r)}$ | $\frac{CE(T,\pi_\theta^{dpg})}{TI(Pierre)}$ | $\frac{mf\_frq(\pi_\theta^{dpg})}{mf\_frq(r)}$ | $\frac{CE(T,\pi_H^{dks})}{CE(T,r)}$ | $\frac{mf\_frq(\pi_H^{dks})}{mf\_frq(r)}$ |
|---|---|---|---|---|---|---|---|
| 500 | 1.008 | 1.252 | 0.76 | 1.18 | 281.51 | 0.758 | 224.94 |
| 1000 | 1.014 | 1.102 | 0.762 | 1.178 | 240.40 | 0.76 | 218.24 |
| 5000 | 1.019 | 1.21 | 0.865 | 1.059 | 34.73 | 0.847 | 28.69 |
| 10000 | 1.014 | 1.067 | 0.968 | 1.023 | 2.17 | 0.963 | 2.04 |
| 20000 | 1.004 | 1.023 | 1.0 | 1.006 | 1.03 | 1.002 | 1.01 |

FIG. 18

METHODS AND SYSTEMS FOR PRODUCING NEURAL SEQUENTIAL MODELS

FIELD

The present disclosure relates to machine learning, and more particularly to methods and systems for training neural sequential models.

BACKGROUND

Neural sequential models are useful in various applications that involve producing one or more output (i.e., target) sequences from a context source. The context source can be provided, for instance, by one or more input sequences, such as sequences of tokens in sequence-to-sequence (seq2seq) models, or from other sources. A nonlimiting example sequence is a text sequence.

In an example framework including a sequential model, a context source is introduced to a neural mechanism, such as a neural network implemented by a processor and memory and having one or more layers. The source can represent any of various types of inputs for which a corresponding output (i.e., target) sequence of tokens is desired. The neural mechanism executes the sequential model, characterized by model parameters (e.g., weights), to provide a predicted target sequence (e.g., a next token or tokens in a sequence, up to the complete sequence) given the source.

To improve or assess the effectiveness of the sequential model to produce useful target sequences, the sequential model can be trained, validated, and/or tested using a dataset of training data. Training data can be obtained, for instance, from a training corpus, e.g., a parallel corpus stored in one or more databases. A set of data for training a sequential model typically includes corresponding tuples (e.g., pairs) of sources (e.g., source sequences) and corresponding target sequences.

Training can include providing input training data to the sequential model, generating an output such as a predicted target sequence using the processor, comparing the output to an output based on the target sequences in the training data, and updating model parameters (e.g., weights) of the sequential model by the processor by executing an optimization algorithm. The trained sequential model can further be validated and/or tested by inputting additional training data to assess its effectiveness in generating target sequences. The sequential model can then be used for inference, that is, to generate new predicted target sequences, e.g., at runtime, in response to receiving unknown sources in various applications.

For example, neural sequential text generation models have become well-known in natural language processing (NLP) applications such as but not limited to language modeling, natural language generation (NLG), and machine translation (MT). When enough data is available, these models can be trained end-to-end with impressive results.

Sequential text generation models usually are autoregressive models (AMs), in which inference and training proceed in an autoregressive manner. Namely, the next decoded token (e.g., symbol) in a sequence is predicted by a locally normalized conditional distribution (such as the "softmax"). Conventional training of sequential models involves the construction of a cross-entropy (CE) loss for updating model parameters. For instance, a cross-entropy loss can be derived from combining (e.g., summing) the negative log likelihoods that the model gives to the correct token with respect to each token position in the output (i.e., target) sequence. Training and inference using AM models has several advantages: i) the probability of the sequence is already normalized by the chain-rule over local decisions; ii) max-likelihood (ML) training is easy, because the log-likelihood of the full sequence can simply be the sum of local cross-entropy (CE) losses; and iii) exact sampling of full sequences from the model distribution can be directly obtained through a sequence of local sampling decisions.

However, AMs tend to suffer from a form of myopia. They have difficulty accounting for global properties of the predicted sequences, e.g., from overlooking certain aspects of the semantic input in NLG to duplicating linguistic material or producing "hallucinations" in MT, and generally through being unable to account for long-distance consistency requirements that would be apparent to a human reader. While such defects can be mitigated in the presence of large training datasets, they can become serious when this condition is not met.

SUMMARY

According to one aspect of the disclosed embodiments, methods are provided for producing a normalized sequential model using a processor. A sequential energy-based model computed by a parameterized neural network is provided. The sequential energy-based model defines an unnormalized probability distribution over a target sequence for a context source. The normalized sequential model is produced by projecting the sequential energy-based model onto a target autoregressive model that approximates a normalized distribution associated with the sequential energy-based model.

According to another complementary aspect, the present disclosure provides that the normalized sequential model in embodiments is a text generation model, such as a natural language processing (NLP) model. The context source can be, in embodiments, a source sequence such as a source text sequence. In some embodiments, models may be configured to perform NLP tasks including language modeling, dialog, natural language generation (NLG), machine translation (MT), or any combination of these.

According to another complementary aspect, the present disclosure provides a computer program product, comprising code instructions to execute a method according to the previously described aspects for producing a normalized sequential model; and a computer-readable medium, on which is stored a computer program product comprising code instructions for producing a normalized sequential model.

Other features and advantages of the invention will be apparent from the following specification taken in conjunction with the following drawings.

DESCRIPTION OF THE DRAWINGS

The present disclosure will become more fully understood from the detailed description and the accompanying drawings.

FIG. 10 shows example two-stage and cyclic training approaches using a distillation technique for training a normalized sequential model.

FIG. 11A shows pure D, features $m_{+0}$ (super-motif) and $m_{/2}$ (sub-motif) on; FIG. 11B shows pure D, m (motif) and $m_{/2}$ (sub-motif) on; FIG. 11C shows pure D, m on; and FIG. 11D shows mixture D, m on.

FIG. 12 shows results of experiments comparing moments of motif features on distilled datasets using rejection sampling, across different motifs.

FIG. 13 show additional results of an experimental setting according to FIG. 11C.

FIG. 14 shows a comparison of training time between training methods using rejection sampling (rs) and self-normalized importance sampling (snis) approaches for various motifs.

FIG. 15 shows a comparison of performance between experiments performed using two-stage and cyclical training methods.

FIG. 16 shows an example algorithm for performing an off-policy distributional policy gradient ($DPG_{OFF}$) method.

FIG. 18 shows computed means of ratios of various quantities across experiments using different motifs, features, and seeds for evaluating effectiveness in finding a distributional policy for an EBM representation using example DPG methods.

In the drawings, reference numbers may be reused to identify similar and/or identical elements.

DETAILED DESCRIPTION

Figure 1:
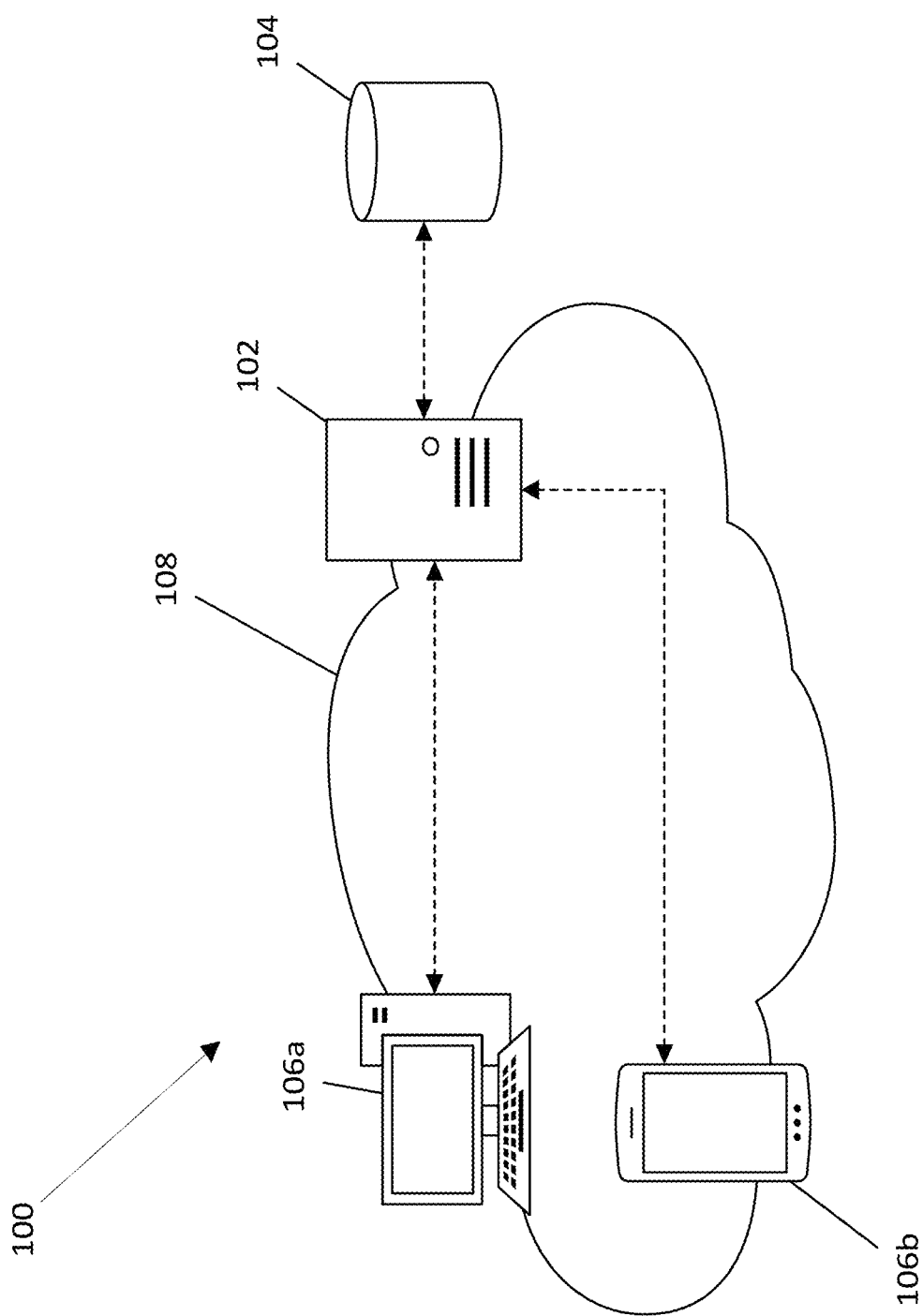
FIG. 1 is an illustration of an example system architecture for implementing example methods.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspects of the invention to the embodiments illustrated.

REFERENCES

The following documents are incorporated by reference herein in their entirety, without an admission that any of these documents constitute prior art:

Daniel Andor, Chris Alberti, David Weiss, Aliaksei Severyn, Alessandro Presta, Kuzman Ganchev, Slav Petrov, and Michael Collins, Globally normalized transition-based neural networks, In Proceedings of the 54th Annual Meeting of the Association for Computational Linguistics (Vol. 1: Long Papers), pages 2442-2452, Berlin, Germany, August 2016.

Dzmitry Bandanau, Philemon Brakel, Kelvin Xu, Anirudh Goyal, Ryan Lowe, Joelle Pineau, Aaron Courville, Yoshua Bengio, An Actor-Critic Algorithm or Sequence Prediction, 2015, 1-17: 2016.

David Belanger, Andrew McCallum, Structured prediction energy networks, In Proceedings of the 33rd International Conference on Machine Learning—Volume 48, ICML '16, pages 983-992, JMLR.org, 2016.

Marc G. Bellemare, Will Dabney, Rémi Munos, A Distributional Perspective on Reinforcement Learning, arXiv: 1707.06887 [cs, stat], July 2017.

Rafael C. Carrasco, Accurate computation of the relative entropy between stochastic regular grammars, Theoretical Informatics and Applications, 31:437-444, 1997.

Corinna Cortes, Mehryar Mohri, Ashish Rastogi, Michael Riley, On the computation of the relative entropy of probabilistic automata, Int. J. Found. Comput. Sci., 19(1): 219-242, 2008.

Jonas Gehring, Michael Auli, David Grangier, Denis Yarats, Yann N. Dauphin, Convolutional sequence to sequence learning, CoRR, 2017, arxiv:1705.03122.

Geoffrey E. Hinton, Oriol Vinyals, Jeffrey Dean, Distilling the knowledge in a neural network, CoRR, abs/1503.02531, 2015.

Cong Duy Vu Hoang, Ioan Calapodescu, Marc Dymetman, Moment Matching Training for Neural Machine Translation: A Preliminary Study, 2018.

Sepp Hochreiter, Jürgen Schmidhuber, Long short-term memory, Neural computation, 9(8): 1735-1780, 1997.

Natasha Jaques, Shixang Gu, Dzmitry Bandanau, Jose Miguel Hernandez Lobato, Richard E. Turner, Doug Eck, Tuning recurrent neural networks with reinforcement learning, 2017.

Tony Jebara, Log-Linear Models, Logistic Regression and Conditional Random Fields, 2013.

Michael I. Jordan, Chapter 8 The exponential family: Basics, 2010.

Taesup Kim, Yoshua Bengio, Deep directed generative models with energy-based probability estimation, CoRR, abs/1606.03439, 2016.

Diederik P. Kingma, Jimmy Ba, Adam: A method for stochastic optimization, arXiv:1412.6980, 2014.

Yann LeCun, Sumit Chopra, Raia Hadsell, Marc' Aurelio Ranzato, Fu Jie Huang, A Tutorial on Energy-Based Learning, Predicting Structured Data, 191-246, 2006.

Volodymyr Mnih, Koray Kavukcuoglu, Zhifeng Chen, Navdeep Jaitly, Mike Schuster, Yonghui Wu, Dale Schuurmans, Reward augmented maximum likelihood for neural structured prediction, In Proceedings of the 30th International Conference on Neural Information Processing Systems, NIPS'16, 1731-1739, USA, 2016.
Andrew Y. Ng, Stuart J. Russell, Algorithms for inverse reinforcement learning, In Proceedings of the Seventeenth International Conference on Machine Learning, ICML '00, San Francisco, CA, USA, 663-670, 2000.
Art Owen, Adaptive Importance Sampling (slides), 2017.
Adam Paszke, Sam Gross, Soumith Chintala, Gregory Chanan, Edward Yang, Zachary DeVito, Zeming Lin, Alban Desmaison, Luca Antiga, Adam Lerer, Automatic differentiation in PyTorch, In NIPS Autodiff Workshop, 2017.
Marc'Aurelio Ranzato, Sumit Chopra, Michael Auli, Wojciech Zaremba, Sequence level training with recurrent neural networks, In 4th International Conference on Learning Representations, ICLR 2016, San Juan, Puerto Rico, May 2-4, 2016, Conference Track Proceedings, 2016.
Christian P. Robert, George Casella, Monte Carlo Statistical Methods (Springer Texts in Statistics), Springer-Verlag, Berlin, Heidelberg, 2005.
Stuart Russell, Learning agents for uncertain environments (extended abstract), In Proceedings of the Eleventh Annual Conference on Computational Learning Theory, COLT'98, New York, NY, USA, 101-103, 1998.
John Schulman, Sergey Levine, Pieter Abbeel, Michael Jordan, Philipp Moritz, Trust region policy optimization, In International conference on machine learning, 1889-1897, 2015.
John Schulman, Filip Wolski, Quoc V. Le, Sequence to sequence learning with neural networks, In Advances in Neural Information Processing Systems 27: Annual Conference on Neural Information Processing Systems 2014, Dec. 8-13, 2014, Montreal, Quebec, Canada, 3104-3112, 2014.
Ilya Sutskever, Oriol Vinyals, Quoc v. Le, Sequence to sequence learning with neural networks, In Advances in Neural Information Processing Systems 27: Annual Conference on Neural Information Processing Systems 2014, Dec. 8-13, 2014, Montreal, Quebec, Canada, 3104-3112, 2014.
Richard S. Sutton and Andrew G. Barto, Reinforcement Learning: An Introduction, The MIT Press, second edition, 2018.
Ashish Vaswani, Noam Shazeer, Niki Parmar, Jakob Uszkoreit, Llion Jones, Aidan N. Gomez, Lukasz Kaiser, Illia Polosukhin, Attention is all you need, In Advances in Neural Information Processing Systems 30: Annual Conference on Neural Information Processing Systems 2017, 4-9 Dec. 2017, Long Beach, CA, USA, 6000-6010, 2017.
Y. Bengio, J. S. Senecal, Adaptive Importance Sampling to Accelerate Training of a Neural Probabilistic Language Model, Ieee Transactions on Neural Networks, 19(4): 713-722, 2008.

System Architecture

Referring now to the figures, example methods disclosed hereunder may be implemented within a system 100 architected as illustrated in FIG. 1. The system 100 includes a processor 102, e.g., a computing device, that is configured to perform example neural sequential model training and inference tasks using one or more neural networks. The processor 102 can communicate with one or more databases 104 that store datasets used for training example models. It will be appreciated that the processor 102 can include either a single processor or multiple processors operating in series or in parallel, and that the database 104 can include one or more databases.

Models including neural sequential models can be generally defined by an algorithm executable by a processor and memory based on one or more neural network layers and a corresponding set of model parameters (e.g., weights). Example models may be configured for processing one or more inputs, such as context sources (e.g., input sequences) and/or for generating one or more outputs, such as output (i.e., target) sequences. Models can be trained by determining the parameters using training datasets having source data (e.g., source sequences or other context sources) and target data (e.g., target sequences, such as text sequences). Available datasets are known for training models, including sequential models. Training of some example models herein can be end-to-end.

During an operation of sequential processing tasks, such as training, validation, testing, and/or inference using neural sequential models, the processor 102 can receive input data from another, connected processor (not shown), from the databases 104, and/or from one or more user terminals 106a, 106b connected via a network 108, or any combination. The processor 102 can process the input data using the model to provide an output, which can be used in further processing by the processor, and/or output to the additional processor (s), the databases 104, and/or the one or more user terminals 106a, 106b. In some example methods, the processor 102 can be configured as a server (or cloud computing device) and one or more of the additional processors or the one or more user terminals 106a, 106b can be configured as clients. The databases 104 may be local to the processor 102, or connected remotely, e.g., via the network 108.

User terminals 106a, 106b include, but are not limited to, personal computers 106a, client computers, client terminals, mobile communication devices 106b, etc., or any other computing device that can be configured for sending and receiving data to the processor 102 according to methods herein. The user terminals 106 may include a display for displaying results of processing by the processor 102 according to example methods.

The processor 102 can include a processing unit and a memory, which can include any combination of random-access memory, non-volatile memory, and storage media. The databases 104 may be provided in communication with the processing unit. Model configuration data (e.g., models, parameters), datasets (e.g., for training, testing, and/or validation), generated input data, generated output data, or other data can be stored in and retrieved from any combination of the memory and the databases 104 as needed. The processor 102, executing code stored in the memory, provides modules for performing steps of example methods herein. Example operations of such modules are explained in further detail below with reference to example methods.

Method for Producing a Normalized Sequential Model

Figure 2:
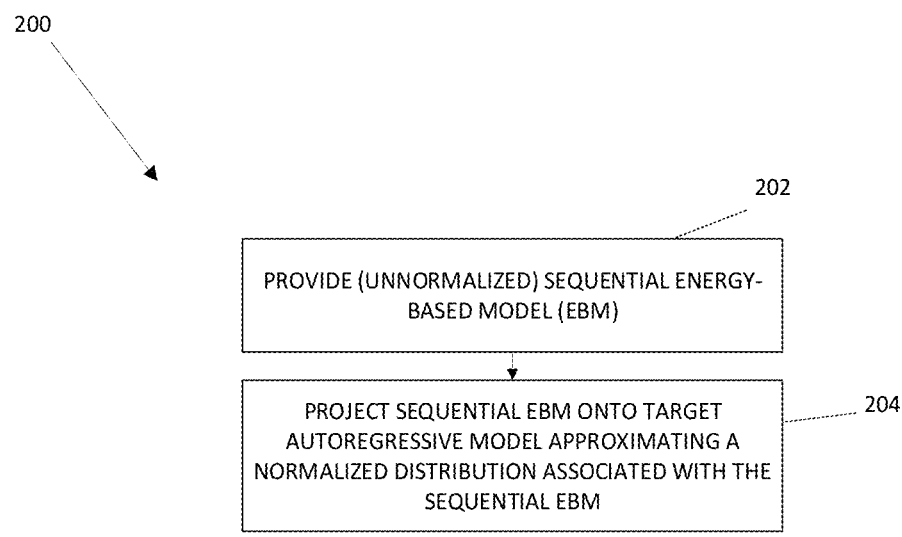
FIG. 2 shows an example method for producing a normalized sequential model from a sequential energy-based model (EBM).

FIG. 2 shows steps in an example method 200 for producing a normalized sequential model using a processor such as processor 102. In some embodiments, the produced normalized sequential model is an autoregressive model (AM). AMs are generally known in the art for neural seq2seq processing. Example AMs include, but are not limited to, RNN/LSTMs (Hochreiter and Schmidhuber, 1997; Sutskever et al., 2014), ConvS2S (Gehring et al., 2017), and Transformer (Vaswani et al., 2017). Any suitable AM can be used in example methods. AMs can be defined by a set of parameters.

Example AMs providing the produced normalized sequential model can be configured to generate (e.g., predict or otherwise generate) a target sequence given a context source. The target sequence can be or include a text sequence (which can also include other tokens such as symbols), for instance where the normalized sequential model is a text generation model or is a component of a text generation model, such as but not limited to a natural language processing (NLP) model or a portion (e.g., a component) of an NLP. The context source can be, for instance, a source sequence such as a source text sequence (e.g., a source sentence), or it may be derived from such a source sequence. The normalized sequential model can be, but is not limited to, a seq2seq model. Example text generation models can be trained end-to-end. In some embodiments, models may be configured to perform NLP tasks such as, but not limited to, language modeling, dialog, natural language generation (NLG), machine translation (MT), or any combination of these.

Formally, AMs can be defined through a distribution $r_\eta(x|C)$, where C is an input (aka Context, e.g., a source sentence in a text generation task such as Machine Translation (MT)), and x is a target sequence to be generated (e.g., a target sentence in MT):

$$r_\eta(x|C) \doteq \Pi_i s_\eta(x_i|x_1, \ldots, x_{i-1}, C), \qquad (1)$$

where each $s_\eta(x_i|x_1, \ldots, x_{i-1}, C)$ is a normalized conditional probability over the next symbol of the sequence, computed by a neural network (NN) with parameters $\eta$. The local normalization of the incremental probabilities implies the overall normalization of the distribution $r_\eta(x|C)$, and consequently, the possibility of directly sampling from it and evaluating the likelihood of training sequences. In Reinforcement Learning terminology, AMs can also be seen as policies where actions are symbols and states are sequence prefixes.

Generally, at 202, a sequential energy-based model (EBM) computed by a parameterized neural network is provided. Energy-Based Models (EBMs) are a generic class of models, characterized by an energy function $U_\eta(x|C)$ computed by a neural network parametrized by $\eta$. Equivalently, they can be seen as directly defining a potential (an unnormalized probability distribution) $P_\eta(x|C) = e^{-U_\eta(x|C)}$, and indirectly a normalized distribution $p_\eta(x|C) = 1/Z_\eta(C) P_\eta(x|C)$, with partition $Z_\eta(C) = \Sigma_x P_\eta(x|C)$. In example methods, one can identify an EBM with its potential (the $P_\eta(x|C)$ form) and be concerned exclusively with sequential EBMs, that is, the case where x is a sequence.

A fundamental property of these models is that, for max-likelihood training, the SGD updates can be computed through the formula:

$$\nabla_\eta \log p_\eta(x|C) = \nabla_\eta \log P_\eta(x|C) - E_{x \sim p_\eta(\cdot|C)} \nabla_\eta \log P_\eta(x|C), \qquad (2)$$

which, in principle, reduces the problem of training with unnormalized potentials to the problem of sampling from them.

This sequential EBM at 202 is unnormalized. AMs are locally normalized and easy to train and sample from. Sequential EBMs, on the other hand, allow global constraints, greater expressivity, and potentially better sample efficiency, but they can lead to unnormalized distributions and are more difficult to use for inference and evaluation. For instance, sequential EBMs may be difficult to sample from to generate an output (i.e., target) sequence.

At 204, to provide the normalized sequential model, the sequential EBM is projected onto a target autoregressive model that approximates a normalized distribution that is associated with the sequential EBM. The target autoregressive model can be, e.g., a conventional or other AM, such as those described elsewhere herein, that is configured to generate (e.g., predict or otherwise generate) a target sequence given the context source. The target autoregressive model can be defined by parameters.

"Approximates" refers to the target autoregressive model, though training, approaching the normalized distribution associated with the sequential EBM. Suitable evaluation and stopping criteria may be used to determine whether the trained target autoregressive model is sufficiently close to the normalized distribution associated with the sequential EBM. "Associated with" refers to the normalized distribution being indirectly defined by the (unnormalized) sequential EBM potential. However, it is not necessary to determine the sequential EBM's associated normalized distribution directly in order to train the target autoregressive model to approximate this associated normalized distribution.

This target autoregressive model can be more easily sampled from, e.g., using known methods for sampling from normalized distributions, and can be easier to use for inference and evaluation. In this way, the more straightforward task of learning an energy-based representation (e.g., the sequential EBM) from available data can be dissociated from the more challenging task of exploiting that representation to produce samples or evaluations.

The sequential EBM at step 202 can be initially provided in any suitable manner (e.g., previously generated and stored within the processor 102, previously generated and stored outside of the processor and then received or acquired by the processor, etc.). In some example methods, the sequential EBM can be first initialized or obtained (from any source) and trained, such as by training methods disclosed herein. Alternatively, an existing sequential EBM can be directly obtained, e.g., imported, from any source.

The sequential EBM provided at 202 can define an unnormalized probability distribution over a target sequence for a context source. Example target sequences and context sources are provided above and elsewhere herein.

In some embodiments, the example sequential EBM includes a locally normalized component and a global component, while in other embodiments the example sequential EBM may omit a locally normalized component or a global component. If the sequential EBM includes locally normalized and global components, the locally normalized and global components can be combined with one another, e.g., by multiplication or other ways, to provide all or part of the sequential EBM.

The locally normalized component can be parameterized by a first set of parameters, and the global component can be parameterized by a second set of parameters. These first and second sets of parameters can be separate from one another, and accordingly the first and second parameters can be trained in separate stages, such as by maintaining the first set while training the second set, or vice versa. Training the locally normalized component and the global component, e.g., the first and second sets of parameters, can be performed in succession, and in some methods can be performed cyclically; e.g., training the first set, then the second set, then retraining the first set and then the second set, etc.

Training can use existing training datasets conventionally used for training sequential models. Multiple datasets, from the same source or multiple sources, can be combined to provide the training datasets. In some example embodiments, additional training datasets are generated, which can be used to supplement existing training datasets.

An example locally normalized component of the sequential EBM can model incremental aspects of sequential data. For example, a locally normalized component can be or include an autoregressive model (AM), e.g., a conventional or other AM, that is configured to generate a target sequence given the context source. The AM can be both locally (that is, over the next token or other portion of in the sequence) normalized, and globally (that is, over the complete sequence) normalized. The global normalization can be based on, e.g., derived from, the local normalization, as explained above. The AMs thus can provide a normalized potential. Example AMs can be embodied in models such as the example AMs disclosed herein. AMs can be parameterized by the first set of parameters.

The global component of the sequential EBM can be or include an exponential potential such as an unnormalized energy-based potential. An example unnormalized energy-based potential is a log-linear potential. The energy-based potential can be parameterized by the second set of parameters.

In some example embodiments, the unnormalized energy-based potential can be a potential that models one or more expected global features of the target sequence given the context source. "Global" is intended to refer to a state of a sequence as a whole, or at least of a portion of a sequence that is larger than a local portion (such as a portion including a next token to be generated in combination with previously generated tokens), whether or not this larger portion represents the sequence as a whole. In some embodiments, though not required in all embodiments, global features can refer to general properties of complete sequences.

Examples of expected global features can include a priori (e.g., previously known or defined, or predetermined) features. For a text generation model, global features can include, but are not limited to, length ratio between a source and a target sequence, duplication/non-duplication of text, consistency with predetermined terminology, presence or absence of semantic features, etc. In example sequential EBMs a plurality of features can be represented by, e.g., encoded in, a feature vector.

As a nonlimiting example, when training a seq2seq model end-to-end to generate an English utterance from a semantic representation (e.g., about certain properties of a POI such as a restaurant), it has been observed that models tended to produce utterances that were fluent, but that either omitted certain semantic material in the input representation, or conversely invented text that did not correspond with existing material in the input. In some other cases, such models may produce duplicates of textual expressions.

Example sequential EBMs and methods disclosed herein can provide a general, principled approach to address such problems by embedding global features. For instance, one can easily define features that correlate with omissions, inventions, duplicates, etc., and use these features inside the sequential EBM so that the model matches the frequency of omissions, inventions, or duplications that it produces with their frequencies in the training data (thus, if there are no such observations in the training data, the example model would also avoid such phenomena).

In some example embodiments, an energy-based potential can include a feature vector representing predefined real features of target sequences, and a weight vector that is combined with the feature vector. In some embodiments, the feature vector and the weight vector are of the same dimension and are combined by multiplication, e.g., by scalar product. The weights in the weight vector can be determined in some embodiments using the second set of parameters or defined by the second set of parameters.

An example sequential energy-based model including an AM combined with an energy-based potential can be provided by a global autoregressive model (GAM) as defined below. Example GAMs are provided herein. GAMs generally combine a locally normalized component (e.g., a first, standard, autoregressive model, denoted r) with a global component.

Figure 3:
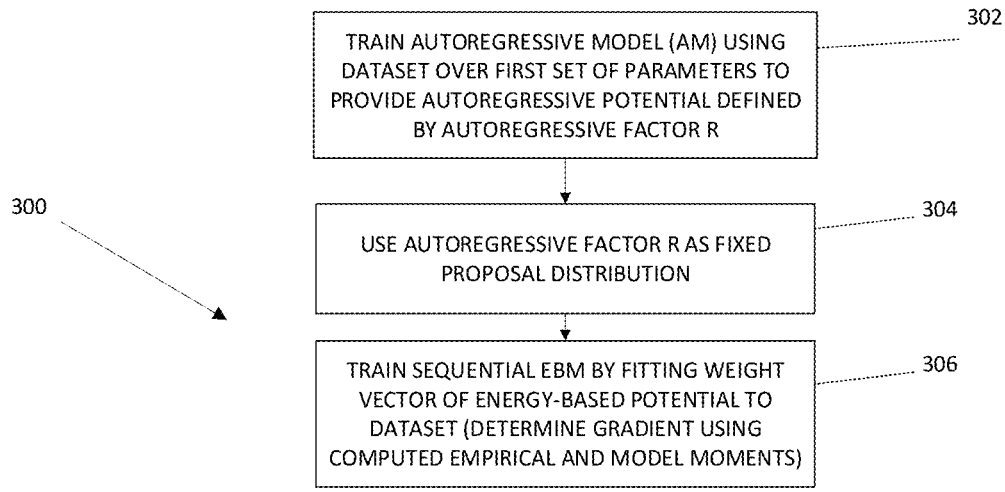
FIG. 3 shows an example method for providing a sequential EBM that includes an autoregressive model (AM) combined with an energy-based potential.

FIG. 3 shows an example method 300 for providing a sequential EBM that includes an AM combined with an energy-based potential as provided herein. At 302 the AM of the sequential EBM, which can be provided in any manner and from any source, is first trained using a dataset, such as an existing dataset, which can include a set of context sources, e.g., source sequences, and corresponding target sequences. A source for an example dataset includes but is not limited to a parallel corpus. Training the AM can be conducted using known or to-be-known methods for training autoregressive models.

The result of the training at 302 is an autoregressive or normalized potential defined by an autoregressive factor r over the first set of parameters. At 304 this autoregressive factor can then be used as a fixed proposal distribution. At 306 the sequential EBM (including the AM and energy-based potential) is then trained by fitting the weight vector of the energy-based potential to the dataset of sequences, which in one embodiment is a dataset of text sequences. The energy-based potential can be initially provided from any suitable source.

In some example embodiments, training the sequential EBM at 306 employs a maximum likelihood approach given the autoregressive factor r. During this training, or at least an iteration of this training, the proposal distribution (the autoregressive factor r) is kept fixed, and an optimization such as stochastic gradient descent (SGD) is performed over the weight vector of the energy-based potential.

In some example embodiments, to determine a gradient for the optimization, an SGD method computes empirical and model moments. Empirical moments are based on an expectation of the (e.g., predetermined) features making up the feature vector relative to the dataset. Model moments are based on an expectation of the features in the feature vector that are predicted by the sequential EBM, e.g., by the GAM having autoregressive factor r.

The empirical moments can be computed using the context source and the target sequences from the dataset. Example methods for computing empirical moments are provided herein, though other methods may be used.

The model moments can be computed using various methods. Example methods account for the unnormalized probability distribution provided by the sequential EBM, which can otherwise make it difficult or sometimes impractical to efficiently sample from the complete EBM.

In some example methods, random samples of target sequences are produced from, e.g., sampled from, the sequential EBM, such as the GAM having autoregressive factor r. A mean of the feature vector in the energy-based potential is then computed over the produced random samples for computing the model moments. Random samples of target sequences can be produced using, for example, one or more Monte-Carlo (e.g., Markov-Chain Monte-Carlo (MCMC)) sampling techniques.

In some example methods, a rejection sampling (rs) technique is used to provide the random samples of target sequences. Rejection sampling can include, for instance, producing a plurality of candidate random samples by sampling from the (normalized) component r of the GAM, and then determining whether to use respective ones of these candidate random samples based on criteria such as a comparison of the unnormalized probability distribution associated with the GAM and the distribution r. For example, an upper bound can be determined with respect to each predetermined feature for a ratio between the unnormalized probability distribution associated with the GAM and the distribution r. Using this upper bound, it can be determined whether respective candidate random samples generated by the GAM are included or excluded.

In other example methods for computing model moments, random samples of target sequences are produced from the GAM having autoregressive factor r, and then the expectation of features is directly estimated using the produced random samples. An illustrative method for directly estimating the expectation of features, referred to herein as self-normalized importance sampling (snis), is explained in further detail below.

Given the computed empirical moments and model moments, a gradient can then be computed that accounts for the difference between these moments. The weight vector of the energy-based potential, and thus of the sequential EBM, can then be updated using the computed gradient.

Figure 4:
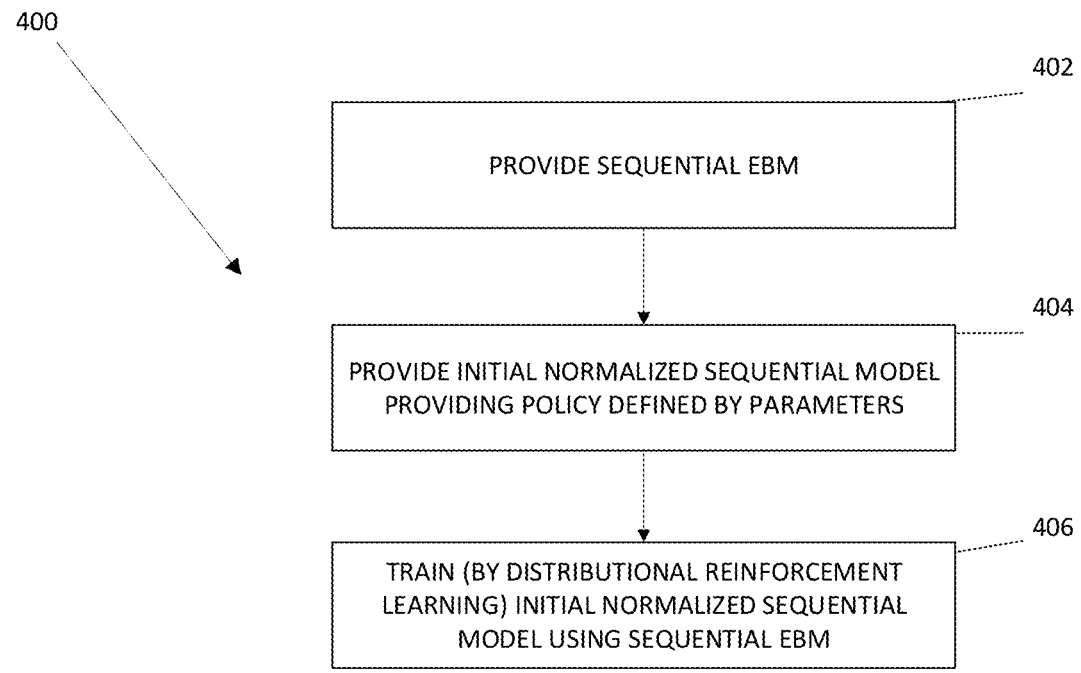
FIG. 4 shows an example method for producing a normalized sequential model by projecting a sequential EBM onto a target autoregressive model.

FIG. 4 shows an example method 400 for producing the normalized sequential model by projecting the (unnormalized) sequential EBM onto a target autoregressive model. At 402 the sequential EBM is provided using any suitable method. Provided EBMs may be configured and trained using any of the example methods described herein, or they may be obtained from any other source. Further, although some example embodiments disclosed herein use global autoregressive models (GAMs) as an example sequential EBM for illustration, other sequential EBMs may be used for the method.

At 404 an initial normalized sequential model is provided. Any suitable method (e.g., selection, importing, generation, training, or any combination) can be used to provide the initial normalized sequential model. In some example methods, the initial normalized sequential model can be an autoregressive model (AM), such as but not limited to an AM corresponding to, based on, or matching an autoregressive model in the sequential energy-based model, with or without prior or additional training. However, other initial normalized sequential models can be used.

At 406 the initial normalized sequential model is trained using the sequential EBM to project the sequential EBM onto the target autoregressive model. It has been discovered by the present inventors that the general problem of deriving an autoregressive model (AM) from an energy-based model has strong similarities with the training of policies in Reinforcement Learning (RL), but in a distributional rather than in an optimization perspective as in standard RL.

Applying a distributional RL approach, the normalized sequential model provided at 404 can be considered a target autoregressive model that provides a policy (e.g., a target policy $\pi_\theta$) that is defined by parameters. In example methods, a sequential EBM can be projected onto this target autoregressive model by training the normalized sequential model (e.g., updating the parameters defining the policy) to minimize cross-entropy (CE) between this policy and the normalized distribution (e.g., p or p(x)) that is associated with the (unnormalized) sequential EBM (e.g., unnormalized distribution P or P(x)).

The association between the unnormalized sequential EBM and its normalized distribution can be provided by or defined by a partition function. However, in example methods, it is not necessary to directly determine this partition function for unnormalized sequential EBMs, as doing so can often be difficult or inefficient. Example methods can approximate the normalized distribution of unnormalized sequential EBMs to project an unnormalized sequential EBM onto the target autoregressive model by minimizing cross-entropy, without the need to directly determine the partition function.

Figure 5:
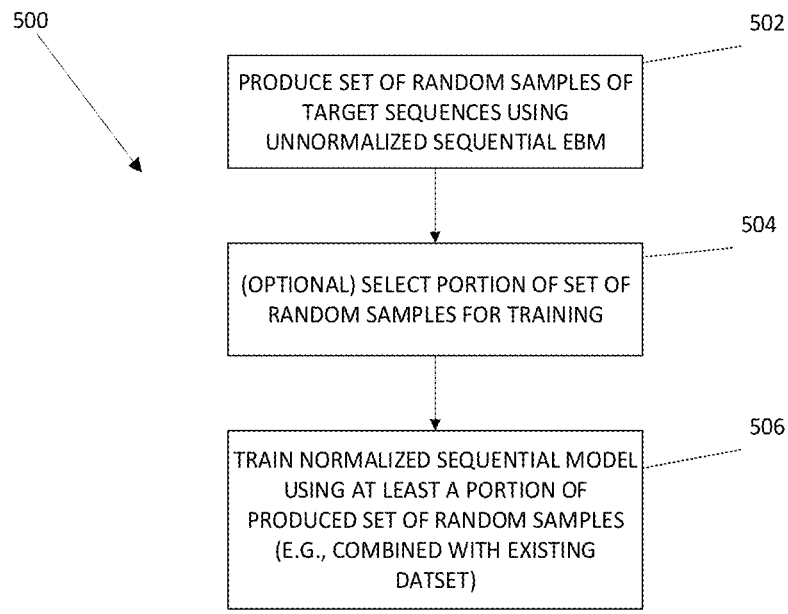
FIG. 5 shows an example method for training a normalized sequential model using a sequential EBM.

FIG. 5 shows an example method 500 for training the normalized sequential model to minimize cross-entropy (CE) between the policy provided by the normalized sequential model and the normalized distribution associated with the unnormalized sequential EBM. The method 500 employs what is referred to herein as a distillation approach, and can be used, for instance, where samples can be efficiently generated from the unnormalized sequential EBM at training time.

At 502 a set of random samples of target sequences, e.g., text sequences, are produced using the provided unnormalized sequential EBM. In some example methods, at 504 a portion of the produced set of random samples is selected for use in training. Then, at 506 the normalized sequential model, e.g., the initially provided normalized sequential model at providing step 404 or one that has previously been updated, is trained using at least a portion (e.g., the selected portion) of the produced set of random samples, up to and including the complete produced set. In some example methods, this portion of the produced set of random samples can be combined with samples from an existing training dataset, including but not limited to a training dataset used to train the sequential EBM, to supplement or augment the dataset.

For instance, a Monte-Carlo sampling technique, such as but not limited to MCMC, can be performed using the unnormalized sequential EBM to produce a set of random target sequences at 502. In some example embodiments, the unnormalized sequential EBM may include a normalized component (potential), which can be used, e.g., sampled from, to produce the set of random target sequences.

Rejection sampling (rs) methods as disclosed herein or other selection methods can be used to select the portion of the produced set of random samples at 504. As a nonlimiting example, if the unnormalized sequential EBM includes a component that is an autoregressive model or other normalized component, this normalized component can be used (e.g., sampled from) to produce a set of random samples, from which a portion can be selected.

The selected portion of the produced set of random samples can be combined with an existing dataset to supplement the dataset. The existing dataset can be, for instance, a training dataset used to initially train the sequential EBM, or a different dataset. The combined or supplemented dataset can then be used for training the normalized sequential model.

In some example training approaches, referred to as cyclical training approaches, the unnormalized sequential EBM can be updated (retrained) after the normalized sequential model is trained at 506. Then, the normalized sequential model can be retrained using the updated unnormalized sequential EBM. Determining whether to update the unnormalized sequential EBM can be based on various criteria.

For instance, the sequential EBM may be updated after training the normalized sequential model, such as by retraining the unnormalized sequential EBM using similar methods as used to previously train the unnormalized sequential EBM. In such methods an updated autoregressive model from the retrained unnormalized sequential EBM may be used to produce samples for further training of the normalized sequential model.

Alternatively, the sequential EBM may be initially trained without further training. This is referred to herein as a two-stage training approach.

In an example training for the normalized sequential model at 506, supervised log-likelihood stochastic gradient descent (SGD) can be performed on the normalized sequential model using the portion of the produced set of random samples, e.g., as part of the combined or supplemented dataset. SGD methods, examples of which are provided herein, seek to minimize cross-entropy (CE) between the policy provided by the normalized sequential model and the normalized distribution associated with the sequential EBM.

Figure 6:
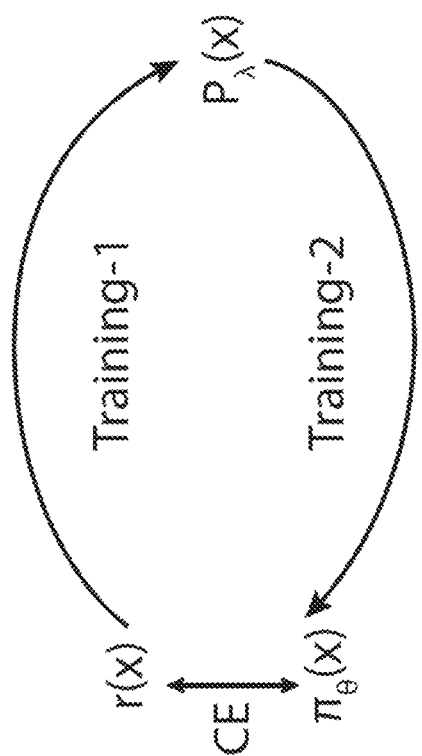
FIG. 6 illustrates a relationship between training stages in example methods for producing a normalized sequential model.

FIG. 6 illustrates a relationship between training stages in example methods. In a first training stage, Training-1, an AM having an autoregressive factor r(x), which can be initially trained, is used to train an (unnormalized) sequential EBM defining a potential P(x). In a second training stage, Training-2, the trained (in Training-1) unnormalized sequential EBM is then used to train a policy $\pi_\theta$ provided by a normalized sequential model to minimize cross-entropy (CE) with the normalized distribution p(x) associated with the unnormalized sequential EBM. The autoregressive factor r(x) can then be retrained if a cyclical training approach is used, which in turn can then be used in a new Training-1 to retrain the unnormalized sequential EBM, and so on.

For instance, if rejection sampling (rs) is used, then during rejection sampling, an acceptance rate (or equivalently, a rejection rate) for the produced samples (e.g., from the AM) can be calculated. It can then be determined whether this acceptance rate has improved according to predetermined criteria (e.g., by a predetermined or otherwise determined amount relative to an initial acceptance rate, an acceptance rate of a previous rs run, a default acceptance rate, etc.).

If it is determined that the acceptance rate is still improving, the unnormalized sequential EBM can then be retrained, including updating the autoregressive factor r and then the unnormalized component, such as the energy-based potential. The updated autoregressive factor r is then used as a new proposal distribution for producing new sample sequences for rejection sampling in further training runs of the normalized sequential model. The further training runs train the normalized sequential model based on the unnormalized distribution associated with the retrained unnormalized sequential EBM.

In some example embodiments, determined upper bounds of a ratio between an unnormalized target distribution provided by the unnormalized sequential EBM and the proposal distribution r can be used for selection during rejection sampling. The acceptance rate for the rejection sampling (e.g., whether or not the acceptance rate is improving) can then be used to determine whether to further update the sequential EBM.

In the two-stage training approach, on the other hand, the unnormalized sequential EBM is not updated (retrained) after initial training (such as Training-1). Training-2 can thus be used with the autoregressive factor r(x) fixed throughout training.

Figure 7:
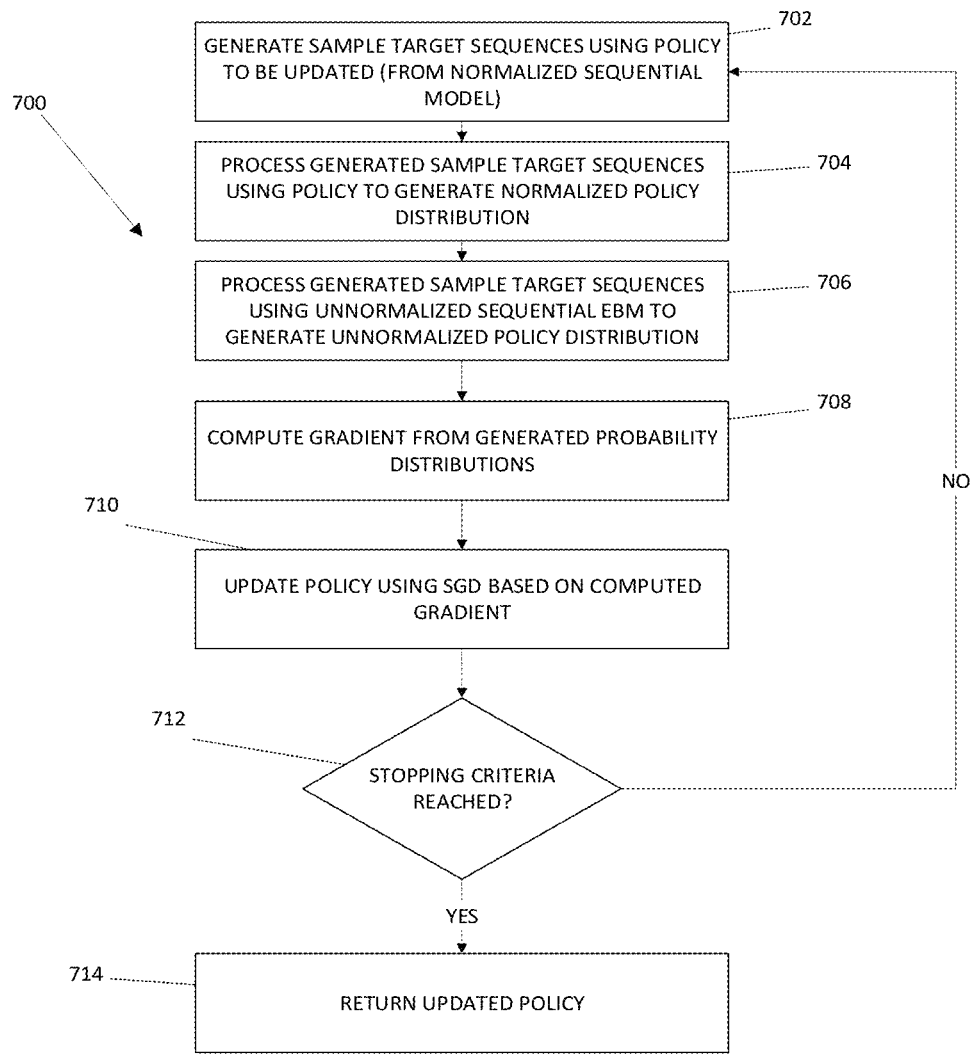
FIG. 7 shows an example on-policy distributional policy gradient ($DPG_{ON}$) method for training a normalized sequential model.
Figure 8:
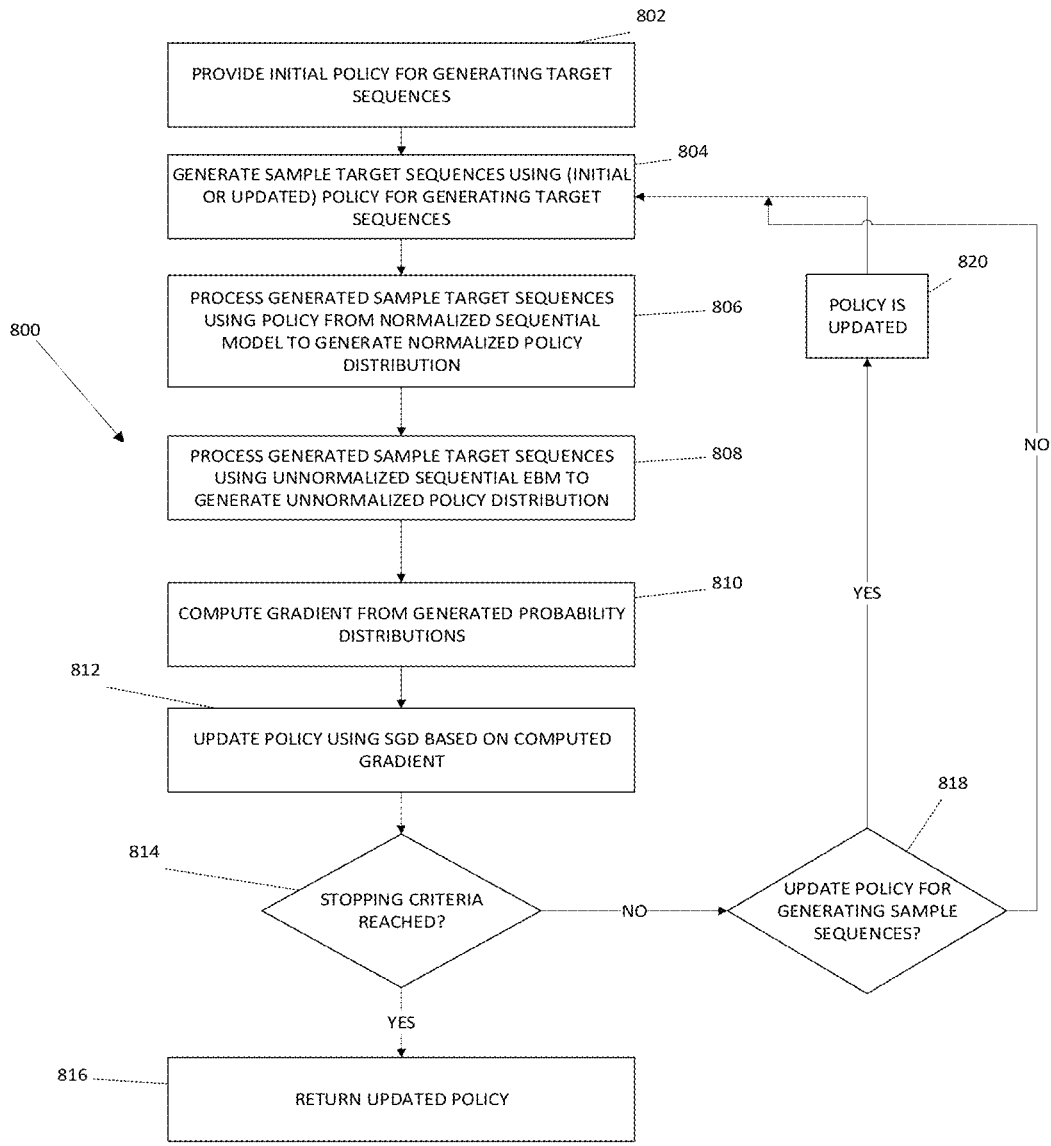
FIG. 8 shows an example off-policy distributional policy gradient ($DPG_{OFF}$) method for training a normalized sequential model.

FIGS. 7-8 show additional example methods 700, 800 for training the normalized sequential model to minimize cross-entropy (CE) between the policy and the normalized distribution associated with the unnormalized sequential EBM, which methods are referred to herein as distributional policy gradient (DPG) approaches. These example methods can be used regardless of whether samples can be efficiently generated from the sequential EBM, and thus have wider applicability than example distillation approaches.

The DPG approaches are generally related to principles of distributional reinforcement learning and are distributional variants of the Policy Gradient technique. These approaches seek to maximize an expectation of a reward that is determined based on a relationship between an unnormalized probability distribution (e.g., as provided by an unnormalized sequential EBM) and a normalized distribution provided by a policy to be updated.

In the example method 700 shown in FIG. 7, referred to herein as an on-policy DPG approach, the policy to be updated, e.g., from the normalized sequential model provided at step 404, is used for generating sample target sequences (e.g., by sampling from the policy) at 702. At 704 the generated sample target sequences are processed using the policy to generate a normalized policy distribution, and at 706 the generated sample target sequences are processed by the unnormalized sequential EBM to generate an unnormalized policy distribution. A gradient can be computed at 708 based on the generated probability distributions, e.g., based on a ratio between the normalized and unnormalized probability distributions. The policy (e.g., the parameters) is then updated at 710 using stochastic gradient descent (SGD) based on the computed gradient. It can then be determined at 712 whether stopping criteria has been reached. If not, the updated policy can then be used at 702 to generate new sample target sequences, which are in turn used to update the policy at 710, etc. If stopping criteria has been reached, the updated policy is returned at 714.

In another example DPG method 800 shown in FIG. 8, referred to herein as an off-policy DPG approach, an initial policy is provided for generating sample target sequences at 802. This initial policy need not be the policy (or even a normalized component of the policy) that is being learned, though it can be in some example methods. In some example methods, a normalized component (e.g., an AM) of the unnormalized EBM can be used as a surrogate for the initial policy for generating sample target sequences, though other initial policies can be used.

For each of one or more iterations, for instance a plurality of iterations, the initial policy for generating sample sequences is used to generate sample sequences at 804. Then, the generated sample target sequences are processed using the (initial or current) policy at 806 to generate a normalized policy distribution, and processed at 808 by the unnormalized sequential EBM to generate an unnormalized policy distribution. A gradient is computed at 810 based on the generated probability distributions, e.g., based on a ratio between the normalized and unnormalized probability distributions. The policy to be learned (e.g., the parameters) is then updated at 812 using stochastic gradient descent based on the computed gradient.

After the iterations in which the policy to be learned is updated, where each iteration uses the same policy for generating samples, it is determined at 814 whether stopping criteria have been reached. If stopping criteria have been reached, the updated policy is returned at 816. If not, it is then determined at 818 whether to update the initial policy (or a previously updated policy) for generating new sample target sequences. As a nonlimiting example, it can be determined whether the current policy to be learned is superior to the current policy for generating samples based on criteria such as but not limited to perplexity that is measured on a validation dataset. If it is determined that the policy for generating new samples should be updated, then the policy is updated at 820, and new samples are generated at 804. Otherwise, new samples are generated at 804 using the initial or previously updated policy for generating samples.

The example DPG off-policy approach can reduce the frequency by which the policy for generating samples is updated. This in turn can improve stability of the proposal, which can also improve convergence.

Inference Method

Figure 9:
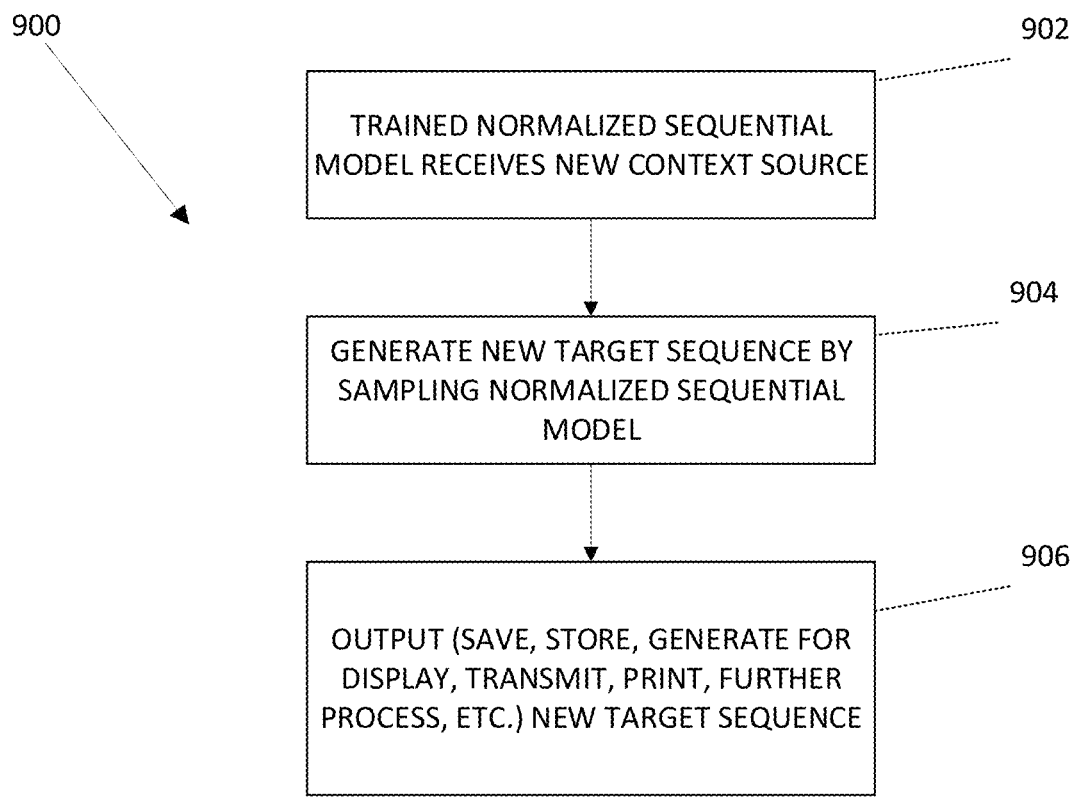
FIG. 9 shows an example inference method at runtime using a produced normalized sequential model.

FIG. 9 shows an example inference method 900 at runtime using the produced normalized sequential model, e.g., the target autoregressive model on which the unnormalized sequential EBM is projected. To perform an inference method, at 902 the produced, e.g., trained, normalized sequential model receives a new (e.g., unknown) context source, e.g., a token sequence such as but not limited to a text sequence. The unknown context source sequence can originate from any of the computing devices disclosed herein.

A new target sequence is generated at 904 using the produced normalized sequential model. For instance, the produced normalized sequential model can provide a normalized probability distribution that is sampled to provide the target sequence (including individual items in the sequence) given the new context source. The new target sequence can be, for instance, an output token sequence such as but not limited to an output text sequence.

At 906 the generated target sequence can then be saved, e.g., in memory (or other storage, e.g., non-transitory storage) for use in additional steps for processing the generated target sequence based on a particular application (if desired), saved in storage, or saved in other ways. Alternately or additionally, the generated target sequence and/or results of further processing of the generated target sequence can be output, for instance to a computing device (e.g., another computer, the mobile communication device, a client device, etc.) over a communication link. Such output can include generating for display the target sequence or results from further processing the target sequence on a display of the computing device, outputting corresponding sounds on a speaker of the computing device, communicating the target sequence or results from further processing the target sequence to the computing device for storage or for additional processing of the generated target sequence by the computing device, printing the target sequence or results from further processing the target sequence, etc. Feedback based on the generated target sequence may be used for further training.

Example Methods Using Global Autoregressive Models (GAMs) with Distillation

Standard autoregressive sequence-to-sequence (seq2seq) models are easily trained by maximum likelihood (max-likelihood) but tend to show poor results under small-data conditions. For illustrating certain inventive aspects, example sequential model training methods will now be described that employ a class of hybrid seq2seq models referred to herein as GAMs (Global Autoregressive Models). However, it will be appreciated that the methods described with respect to GAMs are applicable to other sequential EBMs.

GAMs combine a local autoregressive component with a log-linear component, allowing the use of global a priori features to compensate for a lack of training data. GAMs are related both to the class of Energy-Based Models (EBM) and to that of Exponential Families (EF), and inherit some significant properties from these: an intimate relationship between training and sampling; the identity of empirical and model expectations at maximum-likelihood; and convexity of log-likelihood.

Energy-Based Models (EBM) can be formally defined as provided above. Log-Linear models (Jebara, 2013) are the conditional version of Exponential Families (EF) (Jordan, 2010). The general form of a log-linear model (for the discrete case) is as follows:

$$p_\lambda(x|C) = 1/Z_\lambda(C) \mu(x;C) e^{\langle \lambda(C), \phi(x;C) \rangle}, \quad (3)$$

With $Z_\lambda(C) = \Sigma_x \mu(x;C) e^{\langle \lambda(C), \phi(x;C) \rangle}$. Here $\phi(x; C)$ is a vector of predefined real features of the pair (x, C), which is combined by scalar product with a real vector of weights $\lambda(C)$ of the same dimension. $\mu(x; C)$ is an arbitrary "base measure," which is fixed. These models allow one to introduce prior knowledge through features, and they have good formal properties.

GAMs will now be formally defined. GAMs, or Global Autoregressive Models, are hybrid seq2seq models that exploit both local autoregressive properties as well as global properties of a full target sequence X. A GAM formally is an unnormalized distribution (potential) $P_\eta(x|C)$ over sequence x, parametrized by a vector $\eta = \eta_1 \oplus \eta_2$, which is the product of two factors or components:

$$p_\eta(x|C) = r_{\eta_1}(x|C) \cdot e^{\langle \lambda_{\eta_2}(C), \phi(x;C) \rangle} \quad (4)$$

Here, first factor $r_{\eta_1}(x|C)$ is a local component provided by an autoregressive model (AM) potential for generating x from context C, parametrized by $\eta_1$. The second factor $$e^{\langle \lambda_{\eta_2}(C), \phi(x;C) \rangle}$$

is a global, log-linear potential, which is a vector of predefined real features of the pair (x, C), which is combined by a scalar product with a real vector $\lambda_{\eta_2}(C)$ of the same dimension, computed over the input C by a network parametrized by $\eta_2$. The normalized distribution associated with the GAM is $$p_\eta(x|C) = \frac{P_\eta(x|C)}{z_\eta(C)},$$

where partition $Z_\eta(C) = \Sigma_x P_\eta(x|C)$.

GAMs, which are instances of EBMs, provide various benefits. The first factor above provides that the GAM will have at least the same effectiveness as standard autoregressive models to model the local, incremental, aspects of sequential data. The second factor can be seen as providing a "modulation" on the first one. Further, while one can choose any energy-based potential for the second factor, the log-linear form has several advantages. One advantage is that the features $\phi(x; C)$ provide prior knowledge to the model by drawing its attention to potentially useful global sequence properties that may be difficult for the AM component to discover on its own from limited data.

Another advantage is that with log-linear models, at maximum likelihood, the features expectations according to the model and to the data are equal ("moment matching" property). Here, the gradient relative to the log-linear part $$e^{\langle \lambda_{\eta_2}(C), \phi(x;C) \rangle}$$

takes the simple form:

$$\nabla_{\eta_2} \log p_\eta(x|C) = \phi(x;C) - E_{x \sim p_\eta(\cdot|C)} \phi(x;C) \qquad (5)$$

Log-linear models on their own, while great at expressing prior knowledge, are not as good as AM models at discovering unforeseen regularities in the data. Also, such models are typically problematic to train from a log-likelihood perspective because sampling from them is often unfeasible. GAMs address the former issue through the local component and alleviate the latter issue by permitting the use of r as a powerful "proposal" (aka "surrogate") distribution in importance sampling and related approaches, as provided further below.

Experiment 1—Training and Distillation Using GAMs

To better illustrate capabilities of GAMs and example training methods, experiments were conducted using relatively simple and controllable conditions. An example focus of these experiments was on the unconditional (i.e., language modeling) case, and used synthetic data. The example experimental setup is as follows.

An underlying process $p_{true}$ was considered that generates binary sequences according to a well-defined and flexible process. Example experiments used PFSAs (Probabilistic Finite State Automata) to impose the presence or absence of sub-strings ("motifs") anywhere in the generated data, exploiting the intersection properties of automata.

Due to the dynamic programming properties of PFSAs, it was possible to compute the true entropy $H(p_{true}) = -\Sigma_x p_{true}(x) \log p_{true}(x)$ of the experimental process, as well as other quantities (e.g., partition functions, mean sequence length). It was also possible to generate training (D), validation (V), and test (T) data in arbitrary quantities.

For these experiments an unconditional GAM was employed of the form:

$$p_\lambda(x) \doteq \frac{P_\lambda(x)}{Z_\lambda}, \text{ with } Z_\lambda \doteq \sum_x P_\lambda(x) \text{ and} \qquad (6)$$

$$P_\lambda(x) \doteq r(x) \cdot e^{\langle \lambda, \phi(x) \rangle},$$

Where the autoregressive factor $r = r_{\eta_1}$ is first learnt on the training dataset of sequences D and then kept fixed, and where the parameter vector $\lambda$ is then trained on top of r, also on D. One denotes by $p_\lambda(x)$ the normalized distribution associated with $P_\lambda(x)$.

With r fixed in this way, the example formulation above exactly corresponds to the definition of an exponential family (Jordan, 2010), with r as base measure. In such models, there are two important properties: i) the log-likelihood of the data is convex relative to the parameters $\lambda$, and thus a local maximum is also global; ii) the max-likelihood value $\lambda^*$ has the property that the model expectation $E_{x \sim p_{\lambda^*}(\cdot)} \phi(x)$ is equal to the empirical expectation $|D|^{-1} \Sigma_{x \in D} \phi(x)$ ("moment matching" property of exponential families).

Experiments sought to analyze the relative data efficiency of the GAM compared to the AM r: namely, the ability of the GAM to recover a lower perplexity approximation of $p_{true}$ than r, especially in small training-set conditions.

Training Procedure

The GAM models were trained in two general steps, corresponding to Training-1 and Training-2 described above and illustrated in FIG. 6. In the example Training-1 method, an unnormalized GAM was trained through maximum likelihood. While the unnormalized GAM maximizes the likelihood of the data, it is improper for fast inference or evaluation.

In the example Training-2 method, the GAM obtained from Training-1 was used to train a second autoregressive model that approximates the normalized distribution associated with the GAM and can be used for fast inference and evaluation. Then, perplexities were compared on test data.

Training-1: Training-1 trained the model $P_\lambda$ on D. This was done by first training r on D in a standard way (by cross-entropy (CE)) and then by training $\lambda$ by SGD with the formula (adapted from Equation (5) above):

$$\nabla_\lambda \log p_\lambda(x) = \phi(x) - E_{x \sim p_\lambda(\cdot)} \phi(x) \qquad (7).$$

For computing an estimate of the model moments $E_{x \sim p_\lambda(\cdot)} \phi(x)$, two Monte-Carlo approaches (Robert and Casella, 2005) are compared: i) Rejection Sampling (rs), using r as the proposal distribution; and ii) Self-Normalized Importance Sampling (snis) (Owen, 2017; Y. Bengio and J. S. Senecal, 2008), also using r as the proposal.

Rejection sampling is performed as follows. r(x) is used as the proposal, and $P_\lambda(x) = r(x) e^{\lambda \cdot \phi(x)}$ is used as the unnormalized target distribution; for any specific $\lambda$, because the example features are bounded between 0 and 1, one can easily upper-bound the ratio $$\frac{P_\lambda(x)}{r(x)} = e^{\lambda \cdot \phi(x)}$$

by a number $\beta$.

One then samples x from r, computes the ratio $$\rho(x) = \frac{P_\lambda(x)}{\beta r(x)} \leq 1,$$

and accepts x with probability $\rho(x)$. The accepted samples are unbiased samples from $p_\lambda(x)$ and can be used to estimate model moments.

Self-Normalized Importance Sampling also uses the proposal distribution r, but does not require an upper-bound, and is directly oriented towards the computation of expectations. In this case, one samples a number of points $x_1, \ldots, x_N$, from r, computes "importance ratios"

$$w(x_i) = \frac{P_\lambda(x_i)}{r(x_i)},$$

and estimates $E_{x \sim p_\lambda(\cdot)} \phi(x)$ through $$\hat{E} = \frac{\sum_i w(x_i) \phi(x_i)}{\sum_i w(x_i)}.$$

The estimate is biased for a given N, but consistent (that is, it converges to the true E for $N \to \infty$).

Training-2: while Training-1 results in a well-defined model $P_\lambda(x)$, which may fit the data closely in principle, one should not conclude that $P_\lambda(x)$ is convenient to use for inference—namely, in language modeling, efficiently sampling from its normalized version $p_\lambda(x)$. Further, because of the partition factor $Z_\lambda$, it is also not simple to evaluate the perplexity of $P_\lambda(x)$ on test data.

To aid inference and evaluation, example experiments used a distillation technique. During training, a set of samples is produced from $P_\lambda$, for instance by Monte-Carlo (e.g., rejection sampling) techniques, and this set (which may be arbitrarily larger than the original D) is in turn used to train a new autoregressive model $\pi_\theta(x)$, which can then be used directly for sampling or for computing data likelihood. Again, the original r(x) is used as a proposal distribution.

Experiments used both cyclical and two-stage training. In the case of small |D|, the proposal distribution r is weak, and as a result the example distillation process, based on rejection sampling, can be slow. To address this issue, the cyclical training approach updates the proposal distribution after distilling each batch of samples, with the intention of reducing the rejection rate. Once the process of distillation is finished, the aggregated samples are used to train the final $\pi_\theta$. The two-stage training approach is a variant of the cyclical one, with a fixed proposal, as shown in FIG. 10, and as further detailed below.

A series of experiments were conducted on synthetic data. The experiments focused on distributions $p_{true}(x)$ that were likely to be well approximated by the AM r(x) in the presence of large data.

The first class of distributions was obtained through a PFSA that filters binary strings of fixed length n=30, 0's and 1's being equally probable (white-noise strings), through the condition that they contain a specific substring ("motif") anywhere. Here, the relative frequency of sequences containing the motif among all sequences varies from ~0.01 (shorter motifs |m|=10) to ~0.001 (longer motifs |m|=14).

Further considered are mixtures of two PFSAs (motif/anti-motif): the first (with mixture prob. 0.9) produces white-noise strings containing the motif, and the second (with mixture prob. 0.1) strings excluding the motif.

From these processes, a training set D is produced, of size |D| varying between $5 \cdot 10^2$ and $2 \cdot 10^4$, a validation set V of size 0.25·|D| (but never smaller than $5 \cdot 10^2$ or bigger than $2 \cdot 10^3$) and a test set T of fixed size $5 \cdot 10^3$.

In practical application, prior knowledge about the true process will involve, along with predictive features, a number of noisy and useless features. By training the $\lambda$ parameters to match the empirical moments, the GAM can learn to distinguish between these types. In order to simulate this situation, experiments considered feature vectors over the artificial data that involve both types.

With x the full string and m the fixed motif used in constructing the training data, one considers variations among the seven binary features in the set F:

$$F=\{m, m_{+0}, m_{/2}, d_0, d_1, d_2, d_3\},$$

Where m=0 iff the motif m appears in x, $m_{+0}$=0 iff the motif followed by a zero ("super-motif") appears in x, and $m_{/2}$=0 iff an initial section of the motif ("sub-motif," roughly half the size of m) appears in x. These three features were chosen because they have some correlation with the process for generating the training data. By contrast, the four remaining features are "distractors": $d_0$=0 iff x begins with a 0, $d_1$=0 (resp. $d_2$=0, $d_3$=0) iff a certain random, but fixed string of similar length to m (resp. of larger length or smaller length) appears in x.

Different configurations of these features were tested for training $\lambda$, and the use/non-use of features with a bit-vector ft of length |F| were documented. For instance, ft=0111111 means that all features are exploited, apart from m.

In the example experiments, one of the provided features, m, is a detector of the motif actually present in the data generating process, an extreme form of prior knowledge used to illustrate the technique. However, milder forms of useful prior features can be provided.

A simple formal example is to consider one real-valued (non-binary) feature for the length, and one for the square of the length. By matching the data expectations of these two additional features, the model is able to represent the mean and variance of length in the data. Here, the prior knowledge provided to the model just tells it to be attentive to the distribution of length, a much weaker form of prior knowledge than telling it to be attentive to a specific motif.

The AMs were implemented in PyTorch (Paszke et al., 2017) using a two-layered LSTM (Hochreiter and Schmidhuber, 1997) with hidden-state size 200. The input is presented through one-hot encodings over the vocabulary $V=\{0, 1, \langle EOS \rangle\}$. These LSTMs are optimized with Adam (Kingma and Ba, 2014), with learning rate $\alpha$=0.001, and with early stopping (patience=20) over a validation set.

The specific implementation is shown in FIG. 10 as Algorithm 1. Additional details of the training stages used in the method will now be discussed.

Training-1. For training $P_\lambda(x)$, the experiments tested two approaches (regimes) (tReg) in Equation (7) above, namely rs and snis. In both cases, the methods first trained r(x) on whatever D is available, and used it as the proposal distribution. During rs, the experimental method computes the model's expectation over 10 accepted samples, updates the $\lambda$'s according to Equation (7), and iterates. During snis, a buffer was kept of the last $5 \cdot 10^4$ samples from r(x) to compute the weighted average of the feature moments. For the training of $\lambda$'s, the method used a basic SGD optimization with learning rate $$\alpha(\#epoch) = \frac{\alpha_0}{1 + \#epoch}, \alpha_0 = 10.$$

To assess the quality of $P_\lambda(x)$ for early stopping during training, the method used the distance between the empirical and model moments:

$$\ell_{1\_mom} \left\| \frac{1}{|D|} \sum_{d \in D} \phi(d) - E_{x \sim p\lambda(\cdot)} \phi(x) \right\|_1 \tag{8}$$

Training-2 and Cyclical Training. When distilling from $P_\lambda$ in Training-2, the method used a single proposal r, and systematically produced a distilled dataset of size DsSize=$2 \cdot 10^4$, which corresponds to the highest value of |D| among those considered for training r. In Cyclical Training, the distillation process is performed in several stages, with an evolving r for improving the rejection rate.

Results

Cross Entropy: The cross-entropy (measured in nats) was compared between the initial AM r(x) relative to the test set T and the final AM $\pi_\theta(x)$ also relative to T. The experiments varied the size of $|D| \in \{0.5, 1, 5, 10, 20\} \cdot 10^3$, the regimes (tReg) for Training-1 (rs or snis), the features employed, and the rarity of the motifs. FIGS. 11A-11D depict the resulting curves at the end of the two-stage training (plain lines) for a subset of the experiments. FIGS. 11A-11D show cross-entropy in nats per character and frequency of sampling motif, depending on |D|. Two-stage training was used.

Figure 11A:
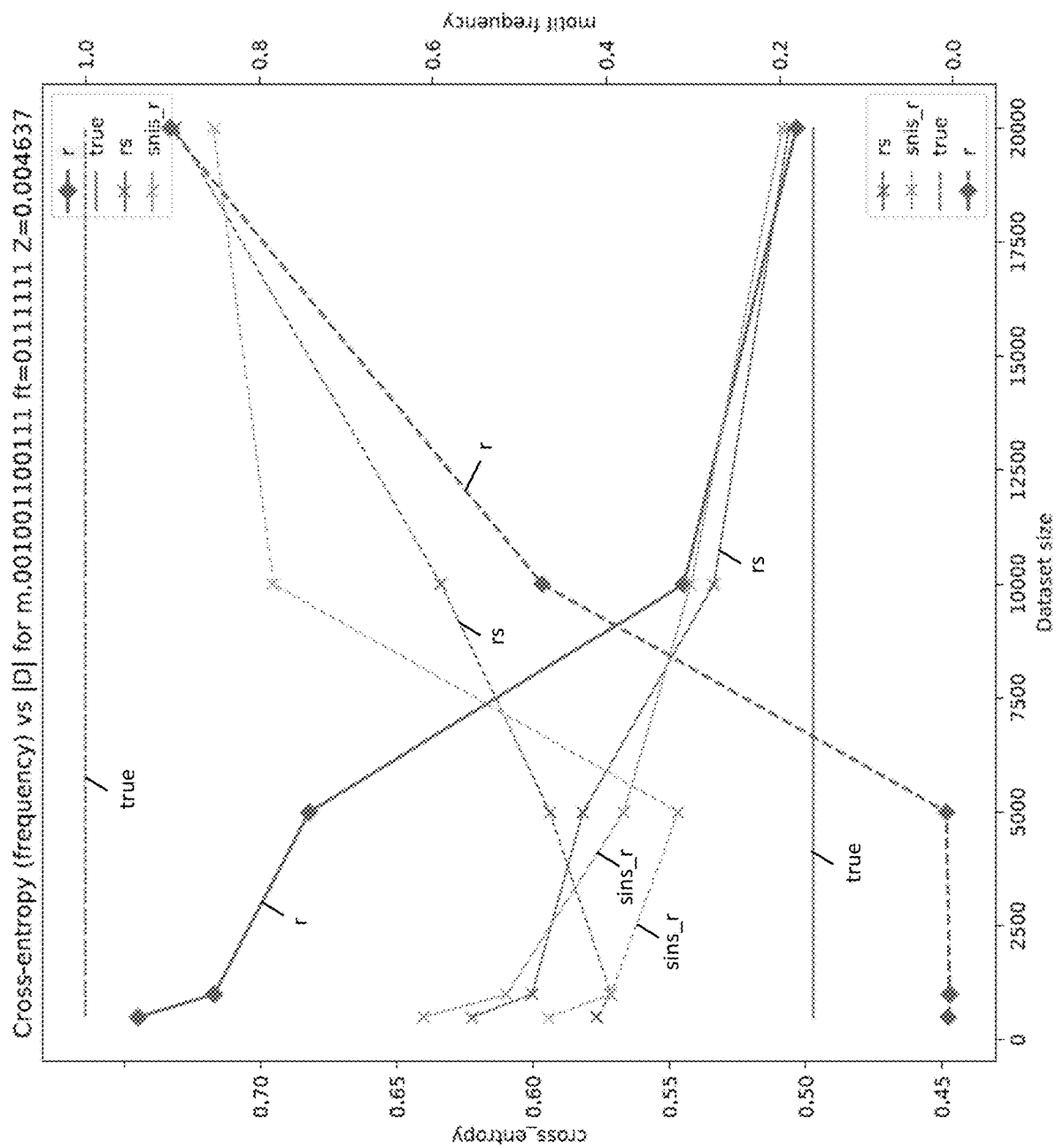
FIGS. 11A-11D show relationships between cross-entropy (CE) (nats per character and frequency of sampling motif) and dataset size for experimental autoregressive models relative to a test set after two-stage training, where
Figure 11B:
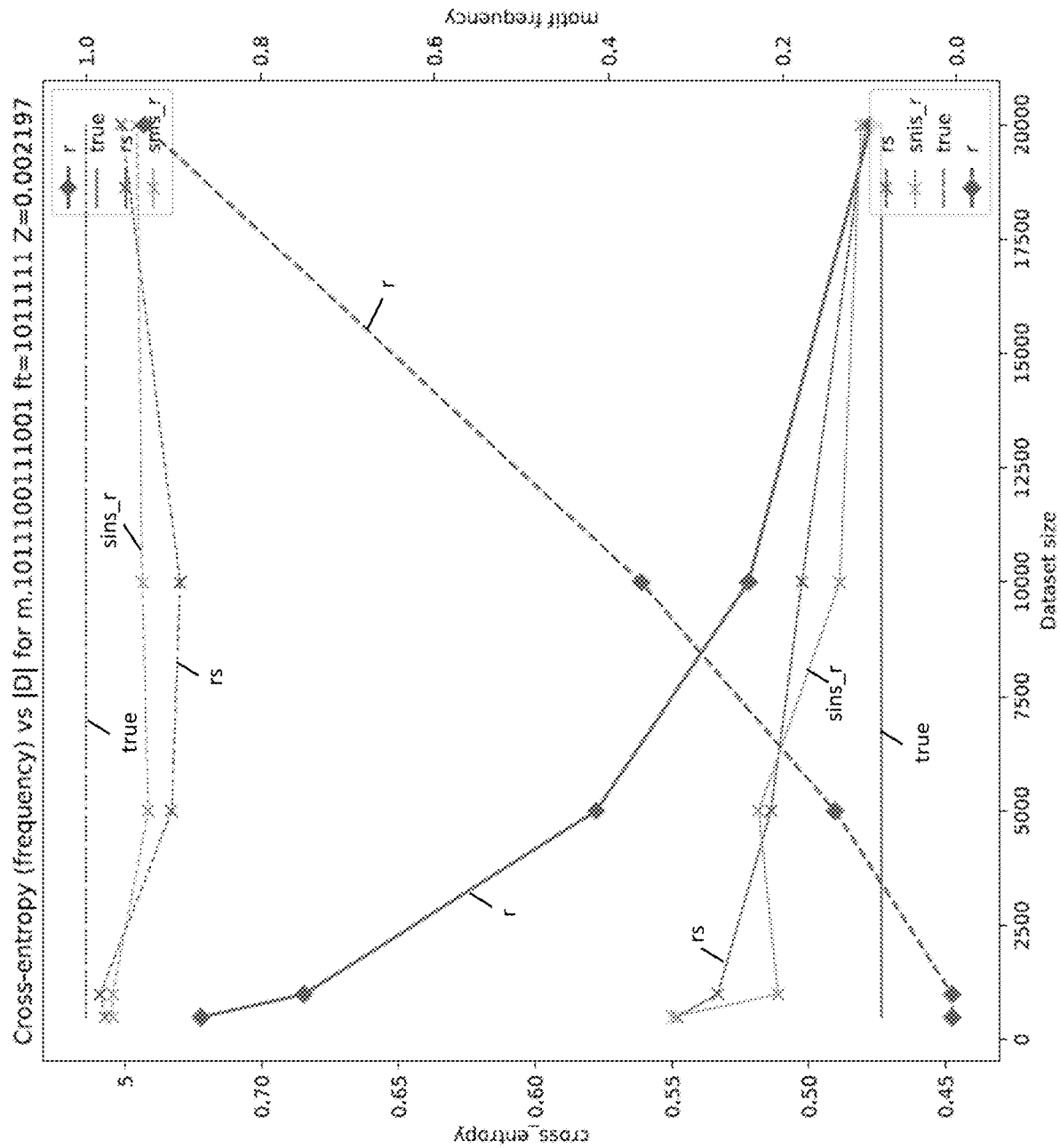
Figure 11C:
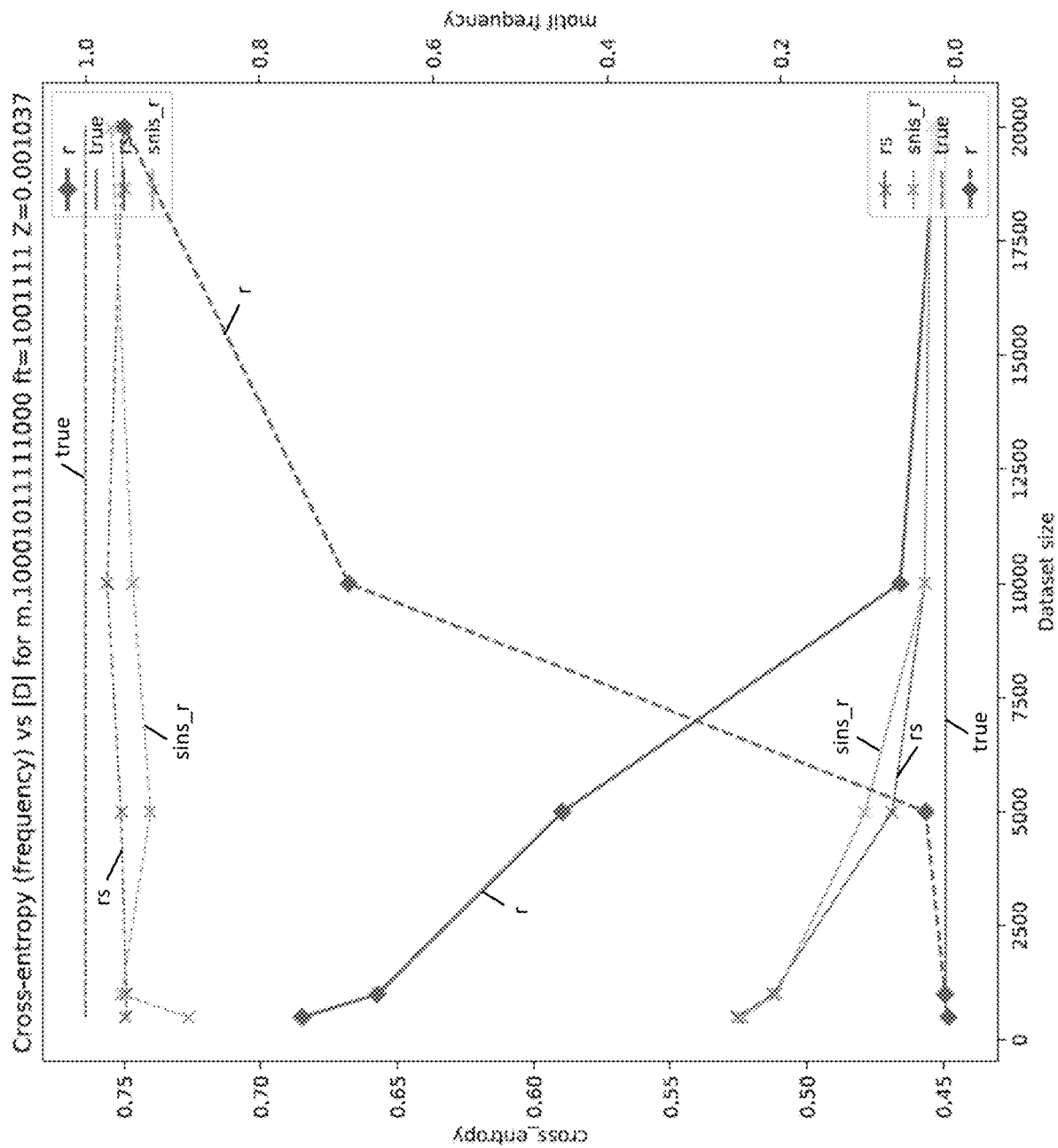
Figure 11D:
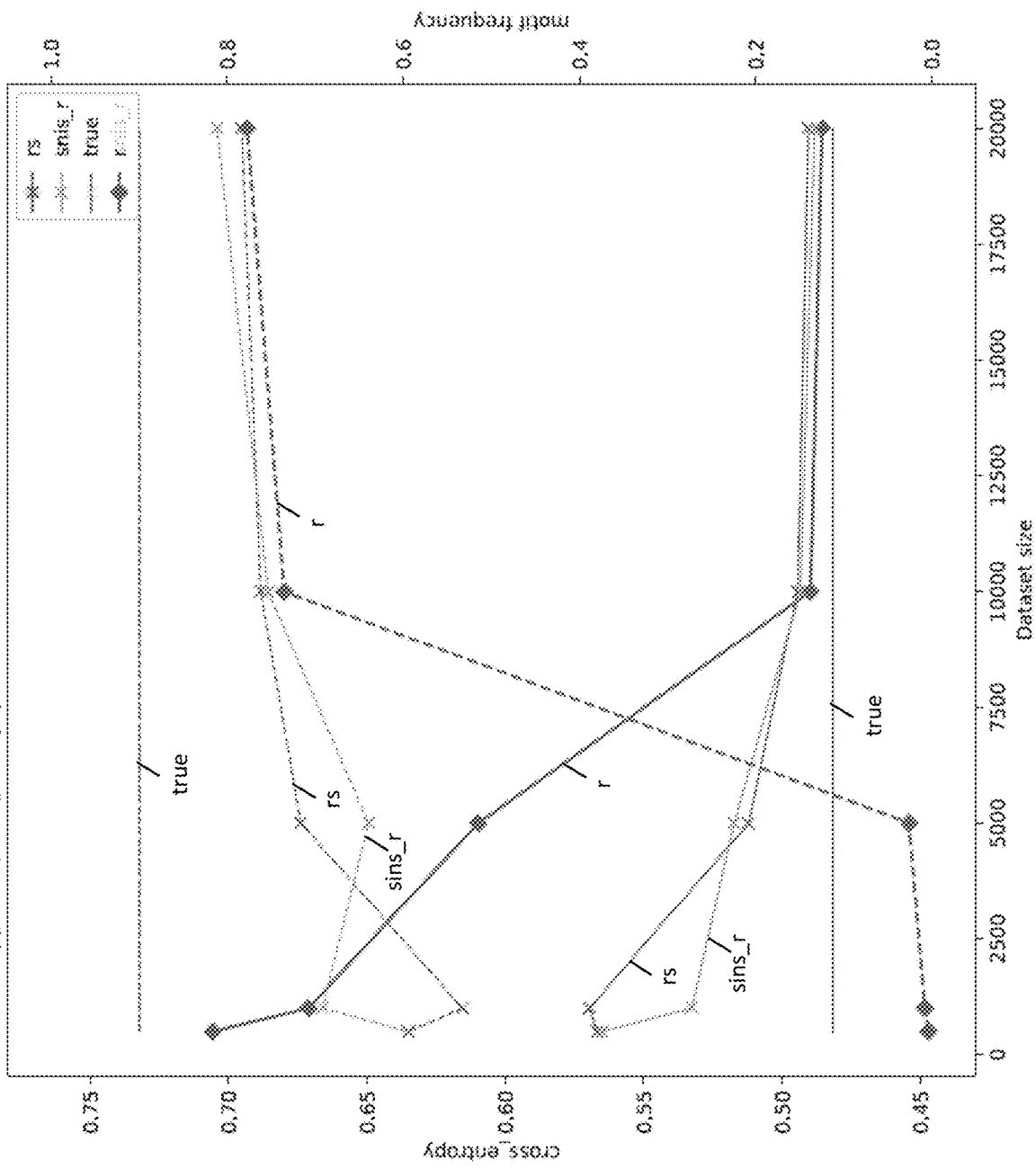

Features $d_0$, $d_1$, $d_2$, $d_3$ are on for all panels ($ft_{[4:7]}=\{1111\}$). FIG. 11A shows pure D, features $m_{+0}$ (super-motif) and $m_{/2}$ (sub-motif) on; FIG. 11B shows pure D, m (motif) and $m_{/2}$ (sub-motif) on; FIG. 11C shows pure D, m on; and FIG. 11D shows mixture D, m on. The plain lines represent cross-entropy, and the dashed lined motif frequency.

It was observed that, for a small dataset size |D|, there was a large gap between the CE of r(x) and the CE of $\pi_\theta(x)$. As |D| increases, these cross-entropies become closer to one another, but a large gap persisted for |D|=5000.

The presence of the "fully predictive" feature m resulted in a $\pi_\theta(x)$ that has CE very close to the theoretical entropy, even in low |D| regimes, where r on its own is very weak. (The CE of a model relative to the true underlying process (approximated by the test set T) can never be below the entropy of this process, due to the KL-divergence being non-negative). Thus, not only is the distilled AM much better than the initial AM, but this is an indication that $P_\lambda$ itself (for which the cross-entropy is more difficult to compute exactly) is a good approximation of the true process.

By contrast, if them feature is absent, then, while $\pi_\theta$ is still better than r in low |D| regimes, it cannot reach the theoretical entropy in such regimes, because features such as $m_{0+}$ (super motif) and $m_{/2}$ (sub-motif) can only partially model the data. With large |D|, on the other hand, r on itself does a good job at predicting the data, and $P_\lambda$ adds little on top of its r component. With "bad" r(x) the exponential term in $P_\lambda(x)$ cannot allocate little mass on the strings without the motif due to the unavailability of such features.

The two regimes for training $P_\lambda(x)$, rs and snis, resulted in $\pi_\theta$'s with similar accuracies. It was also observed that with a good performance of $\pi_\theta(x)$, the moments of motif feature on the distilled dataset were close to the true ones, as explained in more detail below. These trends were consistent across the experiments with different motifs, as illustrated by FIG. 12, which shows overall statistics:

For $D_m$, motif∈{10001010001,01011101101,001001100111, 1011100111001,10001011111000}, ft∈{1001111,1011111,0111111} and for $D_{mam}$, motif∈{01011101101,001001100111,1011100111001, 100010100011,10001011111000}, ft∈{1001111}.

Motif frequencies: To assess the predictive properties of obtained AMs, the experiments also compared the frequency of motifs in strings sampled from r and from $\pi_\theta(2 \cdot 10^3$ samples in total). FIGS. 11A-11D illustrate that when varying |D|, the frequency of motifs (dashed lines) is aligned with the CE performance. Namely, $\pi_\theta$ produces a higher fraction of strings with motif than r when |D| is small (|D|∈{0.5, 1, 5}·$10^3$).

Further illustration of one experiment with reference to FIG. 13 will now be provided. The setting in FIG. 13 is from FIG. 11C: n=30, motif=10001011111000 (always present in D), ft=1011111, |D|=5000, rs used for Training-1. $H(p_{true})$=0.449 with pure $D_m$ and ft=1001111; $H(p_{true})$=0.482 with mixture of motif-anti-motif $D_{mam}$. Lines 1, 2, 3 show one example from true, r, $\pi_\theta$ respectively.

With a training set of size 5000, r was only able to generate the motif a fraction of the time (0.045, see line 10), but was better able to generate some sub-motifs (underlined); $\pi_\theta$ generated the motif frequently (0.959), as illustrated on line 3. With the features from ft (line 4), Training-1 produces a $P_\lambda$ with first feature $\lambda_m$ strongly negative (line 5), meaning that $P_\lambda$ strongly penalizes the absence of the motif: the "distractor" features $d_0$, $d_1$, $d_2$, $d_3$ get a weight close to 0, meaning that they have little predictive power in combination with feature m. It can be seen from lines 6, 7, 8 that $\pi_\theta$ was much better able to approximate the true feature expectations than r [features of expectations (aka moments) under r (resp. $\pi_\theta$): (resp. $E_{x \sim \pi_\theta(\cdot)}\phi(x)$)]. As shown in line 9, the CE $\pi_\theta$ of relative to the test set is close to the true entropy of the process, while that of r is much further away.

Mixture $D_{mam}$ vs pure $D_m$: In the experiments, the strings in $D_{mam}$ (motif-anti-motif) contain a motif with p=0.9. However, if not all the samples in $D_{mam}$ contain the motif, then the motif feature itself is not fully predictive. It can be seen in FIG. 12 that the $\pi_\theta$ achieved with $P_\lambda$ trained on mixture $D_{mam}$ has consistent behavior with the results obtained on the pure $D_m$ of panels (a,b,c).

Regimes in Training-1: For training GAM two methods were considered, snis and rs. As described above, their impact on $P_\lambda$ leads to $\pi_\theta$'s that have similar CEs and motif frequencies. Despite such resemblance in terms of accuracy, these two example methods differed in terms of speed. This is illustrated in FIG. 14, which shows a comparison of the time for Training-1 in rs and snis; for motif 10001011111000; ft=1011111; $H(p_{true})$=0.449; with pure $D_m$ and ft=1001111; $H(p_{true})$=0.482 with mixture of motif-anti-motif $D_{mam}$.

When r is close to white noise due to small |D|, then for the rare events rs rejects most samples not containing the motif due to the effect of the log linear term and negative value of the component $\lambda_m$ corresponding to the m feature, while $snis_r$ is able to exploit all samples, Despite being faster than rs, $snis_r$ remains competitive in terms of CE.

Cyclical vs. two-stage training: The performance of cyclical training was compared with two-stage training in terms of speed and accuracy for a fixed motif m and features ft, as illustrated in FIG. 15, which compares cyclical training and two-stage training for motif 10001011111000, $D_m$, ft=1001111; where CE is short for CE(T,$\pi_\theta$). It was observed that CEs of the obtained $\pi_\theta$'s were about the same for different values of |D| and Training-1 regimes. On the other hand, there was no systematic improvement in the training speed of one method over the other.

Experimental results demonstrated that, under favorable prior knowledge conditions, the final $\pi_\theta$ was able to perform as well, when trained on small data, as the standard r, trained on large data, in terms of both cross-entropy and motif frequencies. It was also observed that training $P_\lambda$ was easier than training $\pi_\theta$ from it. Intuitively, the small number of parameters to be fitted in the log-linear model involves less work and fewer data than the training of an autoregressive component.

Example methods were more effective when little data is given from $p_{true}$. The presence of "fully predictive" features leads to $\pi_\theta$ with a cross-entropy that is closer to the theoretical one, because otherwise the submotif and supermotif features can only partially model the data. Further, the closer CE of the $\pi_\theta$ is to the theoretical one, the closer are the moments of the distilled dataset to the true ones.

Additionally, snis, while being faster than rs on small D, provides a similar accuracy to $\pi_\theta$. Also, when not all of the given samples are "pure" (mixture $D_{mam}$ contains samples without the motif with prob. 0.1), $P_\lambda(x)$ is still able to put a small weight on strings without the motif and as a result $\pi_\theta$ has good accuracy. The experimental results were consistent across the experiments with different settings.

Training the Normalized Sequential Model Using Distributional Policy Gradient Methods Example Distributional Policy Gradient methods will now be described. Experiments were conducted using DPG methods, which again focused on the simple unconditional (language modelling) version of GAMs, of the form $P_\lambda(x) \doteq r(x) \cdot e^{<\lambda, \phi(x)>}$, and the associated normalized distribution $p_\lambda(x)$ as described above with respect to Experiment 1.

Training: It was assumed that one is given a training set D (resp. a validation set V, a test set T) of sequences x, and a finite collection of real-valued feature functions $\phi_1, \ldots, \phi_k$. The GAM training procedure then is performed in two stages, Training-1 and Training-2. At the end of this two-stage process, the perplexities of r and $\pi_\theta$ were compared on test data: CE(T, r) vs. CE(T, $\pi_\theta$).

Training-1: from data to energy-based representation: This phase included training $P_\lambda$ by max-likelihood (ML) on D. An AM $r=r_{n_l}$ (an initial policy) was trained on D, for instance using a standard AM training method as will be appreciated by an artisan.

With the autoregressive factor r kept fixed, the log-linear weight vector $\lambda$ was then fitted to the data, also on D. To do so, one denotes by log $p_\lambda(D)$ the log-likelihood of the data, and performs SGD over $\lambda$ by observing that the above equation for the unconditional version of GAMs implies:

$$\nabla_\lambda \log p_\lambda(D) = |D| \cdot [E_{x \sim p_D(x)} \phi(x) - E_{x \sim p_\lambda(\cdot)} \phi(x)] \quad (9)$$

Where $E_{x \sim p_D(x)} \phi(x)$ (resp. $E_{x \sim p_\lambda(\cdot)} \phi(x)$) denotes the expectation (aka moment) of the feature vector relative to the data (resp. to the model).

The first, empirical moment can be directly computed from the data, but the second, model moment requires more effort. The most direct way for estimating $E_{x \sim p_\lambda(\cdot)} \phi(x)$ would be to produce a random sample from $p_\lambda(\cdot)$ and to compute the mean of $\phi(x)$ over this sample. In general, when starting from an unnormalized $P_\lambda$ as here, obtaining samples from $p_\lambda$ can be difficult.

One example approach includes applying a Monte-Carlo sampling technique, such as rejection sampling (rs) as explained above, and such an example technique can be applied in experimental conditions. Rejection sampling is feasible in situations where reasonable upper-bounds of the ratio P(x)/q(x) (for q a proposal distribution) can be derived. In other cases, an alternative method such as self-normalized importance sampling (snis) can be used. This latter technique directly estimates the expectation $E_{x \sim p_\lambda(\cdot)} \phi(x)$ without requiring samples from $p_\lambda$. Other MCMC sampling techniques with broader applicability may be used, but they may be difficult to control and slow to converge in some instances.

Training-2: from energy-based representation to distributional policy: The output of the previous stage is an unnormalized EBM, which allows the computation of the potential $P(x)=P_\lambda(x)$ of any given x, but not directly to compute the partition function $Z=\Sigma_x P(x)$ nor the normalized distribution $p(x)=1/Z\ P(x)=p_\lambda(x)$ or to sample from it.

Note that to stress the generality of example techniques, P(x) is used generally to denote any EBM potential over sequences, and $p(x)=1/Z\ P(x)$, with $Z=\Sigma_x P(x)$, is used to denote its associated normalized distribution. This is applicable whether P(x) is obtained or not through Training-1 in a GAM-style approach.

In RL terms, the score P(x) can be seen as a reward. A standard RL-as-optimization view would lead one to search for a way to maximize the expectation of this reward; in other words, for a policy $\pi_{\theta^*}$ with $\theta^* = \arg\max_\theta E_{x \sim \pi_\theta(\cdot)} P(x)$, which would tend to concentrate all its mass on a few sequences. By contrast, an example RL-as-sampling (distributional) view includes trying to find a policy $\pi_{\theta^*}$ that approximates the distribution p as closely as possible, in terms of cross-entropy CE.

One is thus trying to solve $\theta^* = \arg\min_\theta CE(p, \pi_\theta)$, with $CE(p, \pi_\theta) = -\Sigma_x p(x) \log \pi_\theta(x)$. One has:

$$\nabla_\theta CE(p, \pi_\theta) = -\sum_x p(x) \nabla_\theta \log \pi_\theta(x) = -\mathbb{E}_{x \sim p(\cdot)} \nabla_\theta \log \pi_\theta(x). \quad (10)$$

One can apply equation (10) for SGD optimization, using different approaches.

The distillation approach described herein can be employed in situations where one is able to draw, in reasonable training time, a large number of samples $x_1, \ldots, x_K$ from p. One can then exploit equation (10) directly to update $\theta$, which is in fact equivalent to performing a standard supervised log-likelihood SGD training on the set $\{x_1, \ldots, x_K\}$. This approach uses rejection sampling at training time for obtaining the samples, and then training $\theta$ on these samples to obtain a final autoregressive model $\pi_\theta$, which can be used for efficient sampling at test time and for evaluation. The advantage of the distillation approach is that supervised training of this sort is very successful for standard autoregressive models, with good stability and convergence properties, and an efficient use of the training data through epoch iteration.

By contrast, the example Distribution Policy Gradient (DPG) class of approaches does not involve sampling from p. DPG approaches generally relate to techniques in RL. For example, the last formula of equation (10) can be rewritten as:

$$\sum_x p(x) \nabla_\theta \log \pi_\theta(x) = \frac{1}{Z} \mathbb{E}_{x \sim \pi_\theta(\cdot)} \frac{P(x)}{\pi_\theta(x)} \nabla_\theta \log \pi_\theta(x). \quad (11)$$

This formula is very close to a basic formulation (aka REINFORCE) of Policy Gradient (PG) in RL. In the PG case, one has a reward R(x) and tries to maximize the expectation $\mathbb{E}_{x \sim \pi_\theta(\cdot)} R(x)$.

It can be shown that $\nabla_\theta \mathbb{E}_{x \sim \pi_\theta(\cdot)} R(x) = \mathbb{E}_{x \sim \pi_\theta(\cdot)} R(x) \nabla_\theta \log \pi_\theta(x)$. Thus, in the RL case, an SGD step is provided by sampling x from $\pi_\theta$ and computing $R(x) \nabla_\theta \log \pi_\theta(x)$, while the SGD step in equation (11) only differs by replacing R(x) by $$\frac{P(x)}{\pi_\theta(x)}$$

(the constant factor can be ignored here; during SGD, it has the effect of rescaling the learning rate.).

The approach in equation (11) is referred to herein as a Distributional Policy Gradient (on-policy version) or $DPG_{on}$ ("on-policy" because the sampling is done according to the same policy $\pi_\theta$ that is being learnt).

An off-policy variant $DPG_{off}$ of equation (11) is also provided. Here, it is assumed that one is given some fixed proposal distribution q and the following is provided:

$$\sum_x p(x)\nabla_\theta \log \pi_\theta(x) = \frac{1}{Z}\mathbb{E}_{x\sim q(\cdot)}\frac{P(x)}{q(x)}\nabla_\theta \log \pi_\theta(x). \quad (12)$$

Here the sampling policy q is different from the policy being learnt, and formula (12) represents a form of importance sampling, with q the proposal, typically chosen to be an approximation to p.

If $DPG_{on}$ is used, difficulty in converging may occur, most likely due in part to the instability induced by the constant change of sampling distribution (namely $\pi_\theta$), similar to that of a basic Policy Gradient in standard RL. In such cases, techniques such as TRPO or PPO may be used to control the rate of change of the sampling distribution.

Methods used in example experiments described herein employ $DPG_{off}$ as provided by the example algorithm shown in FIG. 16. In this example method, suppose that one has as input a potential function P, and an initial proposal distribution q; in the case of GAMs, for instance, one takes $P=P_\lambda$, and a good $\pi_{\theta_a}$ can be provided by r. The example method then iterates the collection of episodes x sampled with the same q (line 4), and performs SGD updates (line 5) according to equation (6) ($\alpha^{(\theta)}$ is the learning rate). In this example method, the proposal q is updated at certain times (line 7), but only based on the condition that the current $\pi_\theta$ is superior to q in terms of perplexity measured on the validation set V, thus ensuring a certain stability of the proposal.

This $DPG_{off}$ method was used in all of the experimental implementations of DPG described below.

Results

To assess the validity of example methods, experiments using $DPG_{off}$ were performed under controllable conditions based on synthetic binary sequences. The example setup is similar to that disclosed above with respect to the distillation experiments described above. Datasets D, V, T of binary sequences were generated according to an underlying process $p_{true}$. This process produces random "white noise" binary strings with fixed length n=30 that are filtered according to whether they contain a specific, fixed, substring ("motif") anywhere inside the sequence. The interest of such a process is that it is efficient to generate datasets (by implementing the filtering process through a probabilistic finite-state automaton (FSA)) and further to directly compute the theoretical entropy (perplexity) of the process. Also, as noted herein, $p_{true}(x)$ can be well approximated by a standard autoregressive model r (x) when the training dataset is large.

In some experiments, a GAM architecture was employed according to the simple unconditional language modeling version above, using a fixed set of five binary features: one feature corresponding to the presence/absence of the motif in the candidate sequence, and four "distractor" features with no (or little) predictive value for the validity of the candidate sequence (this feature set is again denoted by the mask ft=1001111). The motifs m used were varied, as well as the size of the training set D, and the seeds employed. Experiments were also performed involving two continuous features (M and v) assessing length, as explained below.

The experimental implementation was based on PyTorch, with policies (i.e., autoregressive models r and $\pi_\theta$) implemented as LSTM models over the vocabulary {0, 1,<EOS>}, and with each token represented as a one-hot vector. The specific experimental setup used, due to the nature of the example features (binary features or length features M, v), permits one to perform Training-2 methods through distillation as well as (more generally applicable) DPG methods.

To compare the effectiveness of both approaches, experiments varied the training dataset size D and computed the test perplexity (cross-entropy) of the $\pi_\theta$ obtained at the end of Training-1+Training-2, then checked that both distillation and DPG methods lower this perplexity relative to that of the initial r, under small data conditions (data efficiency). The experiments also confirmed that for Training-2 both distillation and DPG were able to almost perfectly approximate the EBM $P_\lambda$ obtained at the end of Training-1 (that is, to approximate the associated normalized $p_\lambda$); in other words, when $P_\lambda$ is able to model the $p_{true}$ accurately (which depends on both the quality of the initial r and on the ability of the features to fit the underlying process), then example DPG methods are able to produce a $\pi_\theta$ that accurately represents $p_{true}$.

Figure 17:
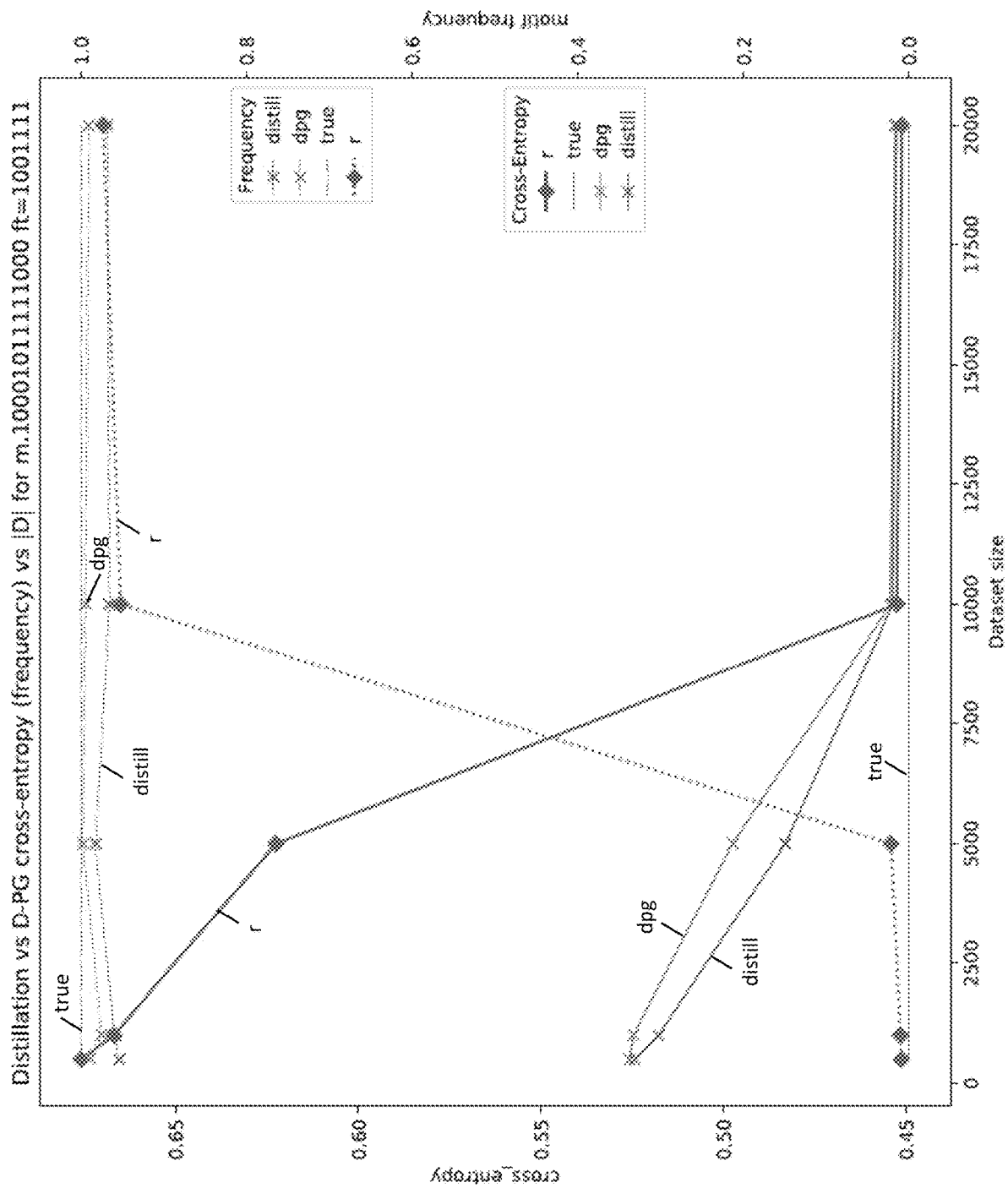
FIG. 17 shows a comparison of cross-entropy (CE) results for experimental distillation and DPG training methods across various dataset sizes, where a first training stage is performed using self-normalized importance sampling (snis).

Overall Training: Distillation vs. DPG: A situation was also considered where Training-1 is done through snis, but Training-2 is done either through Distillation or through DPG (i.e., $DPG_{off}$). This is illustrated in FIG. 17. Here, the motif, feature vector, and seed are fixed, but the training size |D| varies from 500 to 2·10⁴ (the size of the test set T is fixed at 5·10³).

In FIG. 17 the solid lines represent the cross-entropies of the final $\pi_\theta$ relative to the test set, with the scale located on the left side of the figure, while the dashed lines are the frequencies of the motif m (computed on 2000 strings sampled from $\pi_\theta$) with the corresponding scale on the right. Two versions of Training-2 are distinguished, one based on distillation (distill), the other on DPG (dpg).

Consider the points above |D|=5000, and the solid lines: for both distill and dpg, one has CE(T,r)>>CE(T,$\pi_\theta$)≈H ($p_{true}$): $\pi_\theta$ is more data efficient than the initial AM r. For smaller data conditions, the tendency is even stronger, while larger D lead to an initial r which is already very good, and on which the two-stage training cannot improve.

Similar conclusions held for the motif frequencies of $\pi_\theta$ compared to r. In small data conditions, the motif was much more frequently present when using $\pi_\theta$.

Finally, comparing distill and dpg, it is shown that the performances are very comparable, in this case with a slight advantage of distill over dpg in perplexities but the reverse in motif frequencies.

Effectiveness of DPG in approximating p: To emphasize the performance of DPG in Training-2 (that is, its effectiveness at finding a distributional policy $\pi_\theta$ for an EBM representation P(x), independently of the quality of Training-1), two alternatives for P were considered. The first one took $P=P_\lambda$, the energy-based model obtained from Training-1. In the specific experimental conditions, one could accurately estimate (via importance sampling) the partition function Z and therefore compute the cross-entropy CE(T,$p_\lambda$), and compare it with CE(T,$\pi_\theta$): they were very close. That finding was then confirmed by considering an alternative where P was defined a priori in such a way that one could compute p and CE(T,p) exactly, observing the same behavior.

In FIG. 18 the means of ratios of different quantities were computed across experiments with different motifs, features, and seeds:

motif∈{1000101000101,1011100111001, 10001011111000}, ft∈{1001111,Mv1001111}, seed∈{1234,4444}.

In all cases Training-1 is performed using snis.

The results confirm the tendencies illustrated in the previous plots. Namely, when $|D|$ increases the test cross-entropy $CE(T,\pi_\theta)$ gets closer to the theoretical one $H(p_{true})$. Also, $\pi_\theta$ outperforms r in small conditions of $|D|$ for the two modes of Training-2: the columns $$\frac{CE(T, \pi_\theta^{dpg})}{CE(T, r)} \text{ and } \frac{CE(T, \pi_\theta^{dis})}{CE(T, r)}$$

show that the models approximate the true process more closely than the initial r in settings with $|D|<10^4$. Similar conclusions can be drawn when comparing the motif frequencies of $\pi_\theta$ and r.

Further, according to data in columns $$\frac{CE(T, \pi_\theta^{dpg})}{CE(T, \pi_\theta^{dis})} \text{ and } \frac{mtf\_frq(\pi_\theta^{dpg})}{mtf\_frq(\pi_\theta^{dis})},$$

it can be seen that DPG and distillation have comparable efficiency for obtaining the final policy. DPG gives rise to a policy that has better motif frequency but slightly worse cross-entropy than the one from the distillation. In both cases, in small data conditions, the policies (aka autoregressive models) obtained at the end of example processes were very similar and show strong perplexity reduction over the standard autoregressive models.

Figure 19:
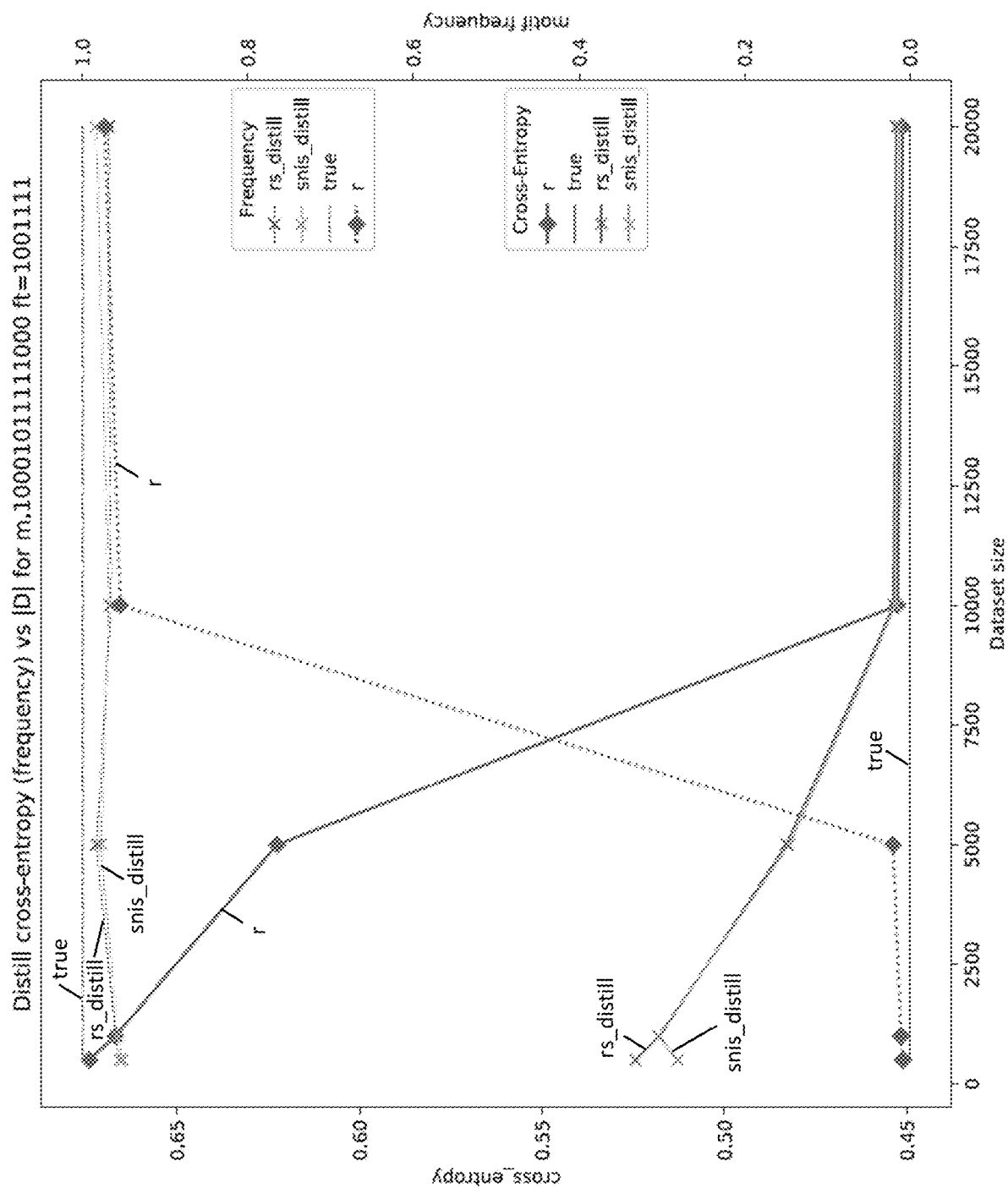
FIG. 19 shows comparative results of rs and snis sampling for Training-1 for example experiments in which distillation was used in Training-2.

FIG. 19 shows a comparison of rs and snis sampling for Training-1. It can be seen that both sampling techniques produced very similar results.

Example methods thus provided RL-inspired techniques for obtaining distributional policies approximating the normalized distribution associated with an energy-based model over sequences. Experiments performed in controlled synthetic conditions confirmed operation of these methods. Note that even though example methods employ sequential EBMs, it will be appreciated that many objects can be decomposed into sequences of actions, and EBMs over such objects can then be addressed in similar ways as those disclosed herein.

While the example algorithm ($DPG_{off}$) provided for computing distributional policies is generic in the sense that it only requires a potential $P(x)$ and a proposal q, the fact that GAMs intrinsically enclose an autoregressive policy r that can be used to initialize such a method is a significant benefit. It can also be observed that the division of work in GAMs between Training-1 and Training-2 helps clarify a distinction that can be made about training sequential EBMs from data.

Effectiveness of DPG in approximating p: To emphasize the performance of DPG in Training-2 (that is, its effectiveness at finding a distributional policy for an EBM representation $P(x)$), independently of the quality of Training-1), two alternatives were considered for P. The first one took $P=P_\lambda$, the energy-based model obtained from Training-1 (the conditions were the same as in FIG. 19, but only snis was considered for Training-1). For these specific experimental conditions, it was possible to accurately estimate (via importance sampling) the partition function Z and therefore to compute the cross-entropy $CE(T,p_\lambda)$, represented by the points labelled p_lambda. It could then be verified that the policy $\pi_\theta$ obtained from $P_\lambda$ by DPG (line dpg pl) was very close to these points.

Figure 20:
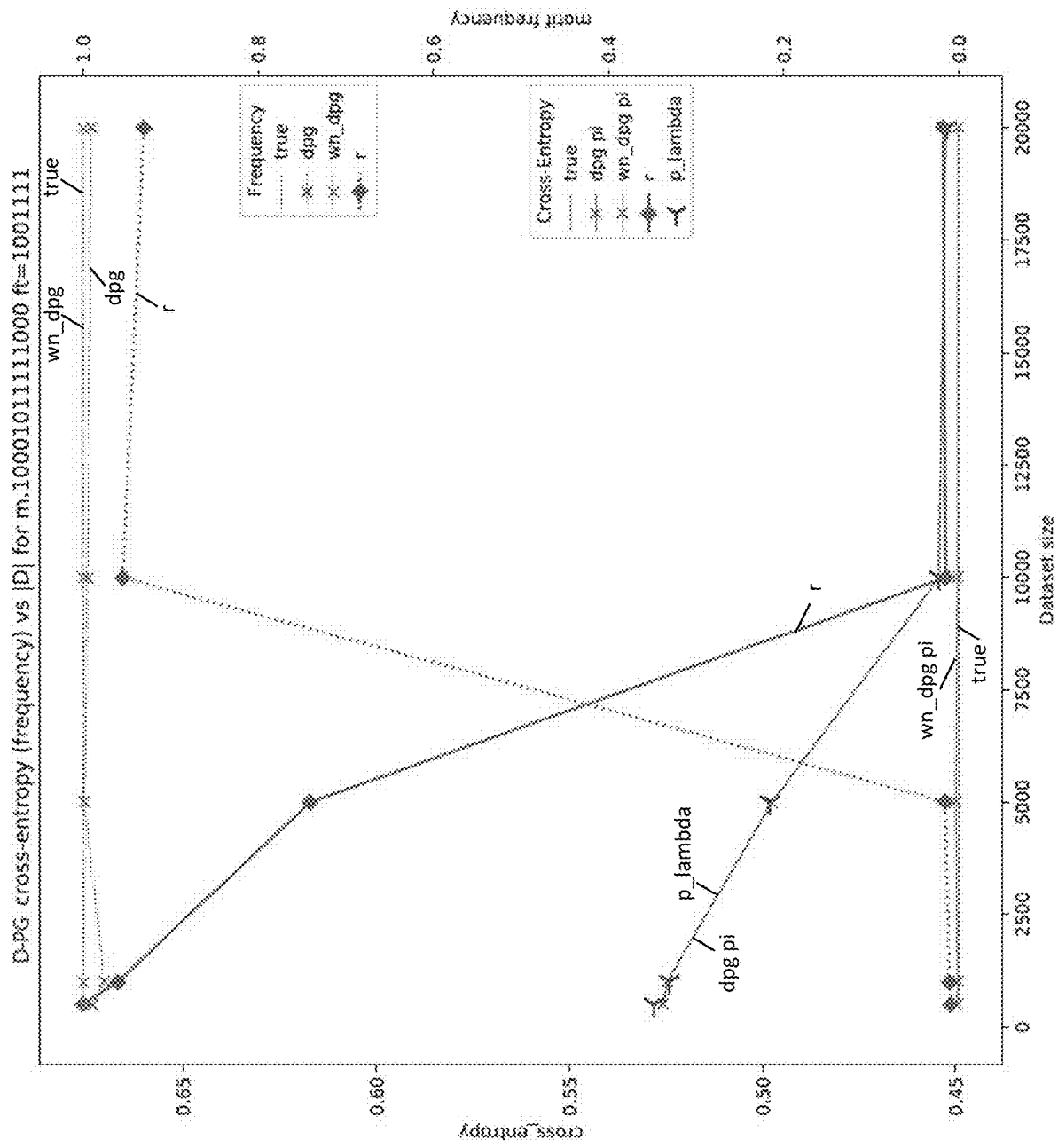
FIG. 20 shows a comparison of DPG vs. p for experiments using a representation P obtained using Training-1 (snis) and an alternative representation P including a white-noise process filtered by a binary predicate checking for presence of a motif.

A second alternative for P was then considered, namely $P(x)=wn(x)\cdot F(x)$, with wn(x) being the white-noise process filtered by a binary predicate F(x) checking for the presence of the motif: in other words, P(x) is an unnormalized version of the true underlying process $p_{true}$. DPG was then applied to this P obtaining the policy represented by the line wn_dpg pl, and it could also be verified that this line was very close to the line corresponding to $p_{true}$ (shown as true in the figure, but almost hidden by the other line). Results comparing DPG vs. p are shown in FIG. 20.

Non-Binary Features in Training-1: Example methods need not rely on binary features only: e.g., presence of a substring, value of the first bit, etc. Sequential EBMs such as GAMs can be applied to continuous features as well, including features that have a strong inter-dependence. Features can also be used that rely on weaker prior knowledge than the presence of specific motifs.

To confirm the use of such alternatives, in further experiments an additional length feature was considered with two components, namely $$\frac{|x|}{max\_len} \in [0, 1]$$

denoted as M and $$\frac{|x|^2}{max\_len^2} \in [0, 1]$$

denoted as v. The moments of these two features correspond to sufficient statistics for the normal distribution, and GAMs can be obtained by essentially matching moments of the given dataset D.

It was then possible during Training-1 to learn the corresponding $\lambda$ parameters using either snis without modification or rs with a modification for computing the upper bound (since the two components are inter-dependent). In experiments the performance of two training setups (distillation and DPG) was rather similar whether the length feature was on or off. To more clearly see the impact of the length feature, the strings in D can be made longer so that the original AM r would be weaker in characterizing the length.

General

In accordance with the disclosed embodiments, there is provided methods and systems for generating normalized sequential models using a processor. Example applications include, but are not limited to, Natural Language Processing (NLP) applications of neural models. Other applications are possible, including but not limited to Natural Language Generation (NLG).

In NLP, for instance, standard autoregressive models (LSTMs, Transformers, etc.) trained end-to-end on source-target data, can have difficulty in accounting for global properties of the data. In machine translation (MT), the model may "hallucinate" target text for which there is no evidence in the source. While such instances are immediately spotted by a human, the seq2seq model may not be able to detect them. Such hallucinations can be easily characterized through global features inside a sequential EBM such as a GAM, and the model can be trained using approaches disclosed herein to avoid them. In addition to MT-specific features, many other global features can be exploited, for instance for controlling the length of the target, the use of certain terminologies, the retrofitting of quality estimation functions inside the incremental policy, etc.

Example methods disclosed herein have various applications to NLP problems, such as but not limited to Natural Language Generation, Language Modeling, Machine Translation, and Summarization. This is especially true in situations with limited training data, because in such cases a standard autoregressive end-to-end training has few opportunities to learn global patterns without the injection of prior knowledge in the form of features. The synthetic data used in experiments provided herein can be replaced with relevant data in such applicative contexts, as will be appreciated by those of ordinary skill in the art. While in RL, one would typically directly provide to a model an externally defined reward, a very strong form of prior knowledge, an example sequential EBM such as but not limited to a GAM "only" indicates to the models which features it might attend to, and training the sequential EBM as disclosed herein then determines the "reward" (e.g., $P_\lambda$) through max-likelihood, a milder form of prior knowledge, more respectful for what the data has to say.

It will be appreciated, however, that example methods have applications beyond NLP. For instance, the fundamental question of sampling from an Energy-Based Model, in general, is an important domain for which such famous methods as MCMC (Markov-Chain Monte-Carlo) have been developed, and is a central technical challenge in Bayesian Machine Learning in particular. Example methods herein for generating normalized sequential models from energy-based models can address such problems by connecting them as provided herein to a distributional form of Reinforcement Learning (RL), with the advantage that the policy obtained at the end of the process may be a more efficient and more explicit sampler than samplers that are currently obtained through MCMC techniques. Example approaches to distributional policies provided herein can be used to develop stable algorithms for standard RL purposes. The importation of policy gradient from standard RL to the distributional view is only one example application of example methods for sampling from an energy-based model. Other applications include, but are not limited to, adapting methods for local credit assignment, such as actor-critic techniques.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A natural language processing method for producing a normalized sequential model using a processor, the method comprising:
    providing a sequential energy-based model computed by a parameterized neural network, the sequential energy-based model defining an unnormalized probability distribution over a target sequence of text for a context source of text; and
    producing the normalized sequential model by projecting the sequential energy-based model onto a target autoregressive model that approximates a normalized distribution associated with the sequential energy-based model;

wherein the normalized sequential model is adapted to generate a target sequence of text from a context sequence of text; and wherein the normalized sequential model is configured to perform one of language modeling, dialog, natural language generation, and machine translation.

2. The method of claim 1, wherein the sequential energy-based model comprises a locally normalized component and a global component.

3. The method of claim 1, wherein the sequential energy-based model comprises:

an autoregressive model generating a sequence given the context source, the autoregressive model being locally and globally normalized, the autoregressive model being parameterized by a first set of parameters; and an unnormalized energy-based potential that is combined with the autoregressive model, the energy-based potential modeling expected global features of the target sequence given the context source, the energy-based potential being parameterized by a second set of parameters.

4. The method of claim 3, wherein the sequential energy-based model comprises a global autoregressive model (GAM).

5. The method of claim 3, wherein the global features are a priori features that comprise one of a length ratio between source and target, a non-duplication of text, and a consistency with predetermined terminology.

6. The method of claim 3, wherein the autoregressive model comprises one of a recurrent neural network (RNN), a long short-term memory (LSTM), a ConvSS, and a Transformer.

7. The method of claim 3, wherein the autoregressive model models incremental aspects of sequential data.

8. The method of claim 3, wherein the energy-based potential is a log-linear potential.

9. The method of claim 3, wherein the energy-based potential comprises:

a feature vector representing predefined real features of sequences; and a weight vector defined by the second set of parameters.

10. The method of claim 9, wherein the feature vector and the weight vector are of the same dimension and are combined by scalar product.

11. The method of claim 9, wherein said providing the sequential energy-based model comprises:

training the autoregressive model using a dataset of text sequences to obtain an autoregressive factor r over the first set of parameters; and using the autoregressive factor r as a proposal distribution, training the sequential energy-based model by fitting the weight vector to the dataset of text sequences using a maximum likelihood approach.

12. The method of claim 11, wherein said training the sequential energy-based model comprises performing stochastic gradient descent (SGD) over the weight vector.

13. The method of claim 12, wherein said performing SGD over the weight vector comprises:

computing empirical moments based on an expectation of the features in the feature vector relative to the dataset;

computing model moments based on an expectation of the features in the feature vector predicted by the sequential energy-based model;

computing a gradient based on said computed empirical and model moments; and updating the weight vector based on said computed gradient.

14. The method of claim 13, wherein said computing the model moments comprises:

producing random samples of target sequences from the autoregressive model; and computing a mean of the feature vector over the produced random samples.

15. The method of claim 14, wherein said producing random samples of target sequences uses a Monte-Carlo sampling technique.

16. The method of claim 15, wherein said producing random samples of target sequences uses rejection sampling (rs).

17. The method of claim 16, wherein the rejection sampling comprises determining whether to use respective ones of the produced random samples based on upper bounds of a ratio between an unnormalized probability distribution and the proposal distribution r.

18. The method of claim 13, wherein said computing the model moments comprises:

producing random samples of target sequences from the autoregressive model; and directly estimating the expectation of the features using self-normalized importance sampling (snis).

19. The method of claim 1, wherein the produced normalized sequential model is an autoregressive model.

20. The method of claim 19, wherein the autoregressive model comprises one of a recurrent neural network (RNN), a long short-term memory (LSTM), a ConvSS, and a Transformer.

21. The method of claim 19, wherein the normalized sequential model provides a policy defined by parameters; and wherein said producing the normalized sequential model comprises:

training the normalized sequential model to minimize cross-entropy between the policy and the normalized distribution associated with the sequential energy-based model.

22. The method of claim 21, wherein the normalized distribution associated with the sequential energy-based model is associated with the defined unnormalized probability distribution by a partition function.

23. The method of claim 21, wherein said training the normalized sequential model uses a distillation approach.

24. The method of claim 21, wherein said training the normalized sequential model comprises:

producing a set of random samples of target sequences using the provided sequential energy-based model; and training the normalized sequential model using at least a portion of the produced set of random samples.

25. The method of claim 24, wherein said training the normalized sequential model comprises performing supervised log-likelihood stochastic gradient descent (SGD) using the portion of the produced set of random samples.

26. The method of claim 24, wherein said training the normalized sequential model uses a training dataset supplemented by the portion of the produced set of random samples.

27. The method of claim 26, wherein the training dataset comprises samples from an existing training dataset used to train the provided sequential energy-based model combined with the portion of the produced set of random samples.

28. The method of claim 24, wherein said producing a set of random samples of target sequences uses a Monte-Carlo sampling technique.

29. The method of claim 28, wherein said producing a set of random samples of target sequences uses rejection sampling (rs).

30. The method of claim 29, wherein the sequential energy-based model comprises:
an autoregressive model generating a sequence given the context source, the autoregressive model being locally normalized, the autoregressive model being parameterized by a first set of parameters; and
an unnormalized energy-based potential that is combined with the autoregressive model, the energy-based potential modeling expected global features of the target sequence given the context source, the energy-based potential being parameterized by a second set of parameters;
wherein said providing the sequential energy-based model comprises:
training the autoregressive model using a dataset of text sequences to obtain an autoregressive factor r over the first set of parameters; and
using the autoregressive factor r as a proposal distribution, and training the sequential energy-based model by fitting the weight vector to the dataset of text sequences using a maximum likelihood approach.

31. The method of claim 30, wherein the rejection sampling comprises determining whether to use respective ones of the produced random samples based on upper bounds of a ratio between an unnormalized target distribution and the proposal distribution r.

32. The method of claim 31, wherein said training the normalized sequential model further comprises:
determining whether an acceptance rate of the rejection sampling is improving according to predetermined criteria;
if it is determined that the acceptance rate is improving:
retraining the autoregressive model to obtain an updated autoregressive factor r over the first set of parameters;
using the updated autoregressive factor r as a proposal distribution, and retraining the sequential energy-based model by fitting the weight vector to the dataset of text sequences; and
further training the normalized sequential model based on the unnormalized distribution associated with the retrained sequential energy-based model.

33. The method of claim 21, wherein said training the normalized sequential model uses a distributional policy gradient approach that seeks to maximize an expectation of a reward based on the unnormalized probability distribution and the policy.

34. The method of claim 21, wherein said training the normalized sequential model comprises:
generating sample target sequences from the policy;
processing the generated sample target sequences using the policy and the unnormalized sequential EBM to generate probability distributions;
computing a gradient based on the generated probability distributions; and
updating the policy using stochastic gradient descent (SGD) based on the computed gradient.

35. The method of claim 34, wherein the computed gradient is based on a ratio between the generated probability distributions.

36. The method of claim 34, further comprising:
generating sample target sequences from the updated policy;
processing the generated sample target sequences using the updated policy and the unnormalized probability distribution to generate probability distributions;
computing a gradient based on the generated probability distributions; and
further updating the policy using stochastic gradient descent (SGD) based on the computed gradient.

37. The method of claim 21, wherein said training the normalized sequential model comprises:
providing an initial policy for generating sample target sequences;
generating sample target sequences from the initial policy;
processing the generated sample target sequences using the policy and the unnormalized probability distribution to generate probability distributions;
computing a gradient based on the generated probability distributions; and
updating the policy using stochastic gradient descent (SGD) based on the computed gradient.

38. The method of claim 37, further comprising:
periodically determining whether to update the initial policy for generating new sample target sequences.

39. The method of claim 38, wherein said periodically determining is based on comparing a measured perplexity of the initial policy and the policy on a validation dataset.

40. The method of claim 37,
wherein the sequential energy-based model comprises:
an autoregressive model defined by an autoregressive factor r and parameterized by a first set of parameters; and
an unnormalized energy-based potential that is combined with the autoregressive model, the energy-based potential modeling expected global features of the target sequence given the context source, the energy-based potential being parameterized by a second set of parameters; and
wherein the initial policy is based on the autoregressive factor r.

41. A natural language processing method of generating a neural sequential model using a processor, the method comprising:
training an autoregressive model to obtain an autoregressive factor r over a first set of parameters using a dataset of text sequences, the autoregressive model being locally and globally normalized; and
using the trained autoregressive model as a proposal distribution, and training an unnormalized energy-based potential that is combined with the autoregressive model, the energy-based potential modeling expected global features of a target sequence of text given a context source of text, the energy-based potential being parameterized by a second set of parameters;
wherein the neural sequential model is adapted to generate an output target sequence of text given an input context source of text; and
wherein the neural sequential model is configured to perform one of language modeling, dialog, natural language generation, and machine translation.

42. The method of claim 41, wherein the energy-based potential comprises a feature vector representing predefined real features of sequences and a weight vector defined by the second set of parameters; and
wherein said training an unnormalized energy-based potential comprises fitting the weight vector to the dataset of text sequences using a maximum likelihood approach.

43. The method of claim 42, wherein said fitting the weight vector to the dataset of text sequences comprises:
   computing empirical moments based on an expectation of the features in the feature vector relative to the dataset;
   computing model moments based on an expectation of the features in the feature vector predicted by a sequential energy-based model;
   computing a gradient based on said computed empirical and model moments; and
   updating the weight vector based on said computed gradient.

44. The method of claim 43, wherein said computing the model moments comprises:
   producing random samples of target sequences from the autoregressive model; and
   computing a mean of the feature vector over the produced random samples.

45. The method of claim 44, wherein said producing random samples uses rejection sampling.

46. The method of claim 43, wherein said computing the model moments comprises:
   producing random samples of target sequences from the autoregressive model; and
   directly estimating the expectation of the features using self-normalized importance sampling (snis).

47. A natural language processing method for generating a target sequence of text from a context source of text using a processor, the method comprising:
   providing a normalized sequential model for generating text trained by a method comprising:
      providing a sequential energy-based model computed by a parameterized neural network, the sequential energy-based model defining an unnormalized probability distribution over a target sequence of text for a context source that is used to produce the target sequence; and
      producing the normalized sequential model for generating text by projecting the sequential energy-based model onto a target autoregressive model that approximates a normalized distribution associated with the sequential energy-based model;
   receiving, by the provided normalized sequential model, the context source of text; and
   generating, by the provided normalized sequential model, the target sequence of text;
   wherein the normalized sequential model is configured to perform one of language modeling, dialog, natural language generation, and machine translation.

48. The method of claim 47, further comprising:
   one of storing the target sequence of text, printing the target sequence of text, transmitting the target sequence of text to a computing device, and providing the target sequence of text for display on a display.

* * * * *